US 6,640,094 B1

(12) United States Patent
Tabeta

(10) Patent No.: US 6,640,094 B1
(45) Date of Patent: Oct. 28, 2003

(54) DIGITAL PHASE LOCK LOOP FOR WIRELESS COMMUNICATION AND APPARATUS USING SAME

(75) Inventor: Hideya Tabeta, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 460 days.

(21) Appl. No.: 09/584,732

(22) Filed: Jun. 1, 2000

(30) Foreign Application Priority Data

Jun. 8, 1999 (JP) .......................................... 11-160736

(51) Int. Cl.[7] .................................................. H04B 1/06
(52) U.S. Cl. ...................... 455/260; 455/557; 370/474; 375/355; 375/375
(58) Field of Search .................................. 455/255, 256, 455/257, 259, 260, 265, 86, 87, 557; 375/373, 375, 376, 371, 354, 355; 327/144, 145, 147, 159; 370/395.61–395.63, 474, 324, 350, 516, 522

(56) References Cited

U.S. PATENT DOCUMENTS 4,855,683 A * 8/1989 Troudet et al. ............. 327/159
6,029,061 A * 2/2000 Kohlschmidt ............... 455/343
6,556,592 B1 * 4/2003 Kasuya ........................ 370/522
2002/0044536 A1 * 4/2002 Izumi et al. ................. 370/329
2002/0051507 A1 * 5/2002 Kiyohiko ..................... 375/375

FOREIGN PATENT DOCUMENTS

| EP | 0 886 420 | 12/1998 |
| JP | 7-307969 | 11/1995 |
| JP | 11-74992 | 3/1999 |

* cited by examiner

Primary Examiner—Lester G. Kincaid
Assistant Examiner—Ronald J. Ward
(74) Attorney, Agent, or Firm—Fitzpatrick, Cella, Harper & Scinto

(57) ABSTRACT

A wireless communication apparatus includes an ISDN interface, an RF unit, and a digital phase-lock loop. When synchronization with the digital line has been established, the digital phase-lock loop counts a clock from the RF unit on the basis of the clock of the ISDN, extracted by the ISDN interface and the output of the digital phase-lock loop, and outputs a clock, so that wireless communication is performed in synchronization with the output of the digital phase-lock loop. When synchronization with the digital line has not been established, the digital phase-lock loop frequency-divides the clock from the RF unit in order to generate a synchronization clock for wireless communication.

4 Claims, 26 Drawing Sheets

| R SS | PR | UW | CI | ORIGINATION ID | RECEIVING ID | I | CRC |
|---|---|---|---|---|---|---|---|
| 4 2 | 62 | 32 | 4 | 42 | 28 | 34 | 16 |

FIG. 9A

| R SS | PR | UW | CI | ORIGINATION ID | I | CRC |
|---|---|---|---|---|---|---|
| 4 2 | 62 | 32 | 4 | 42 | 62 | 16 |

FIG. 9B

| R SS | PR | UW | CI | SA | I(TCH, FACCH, etc.) | CRC |
|---|---|---|---|---|---|---|
| 4 2 | 6 | 16 | 4 | 16 | 160 | 16 |

FIG. 9C

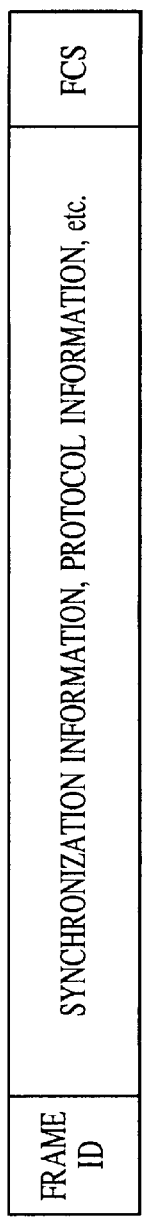
FIG. 10A NEGOTIATION FRAME
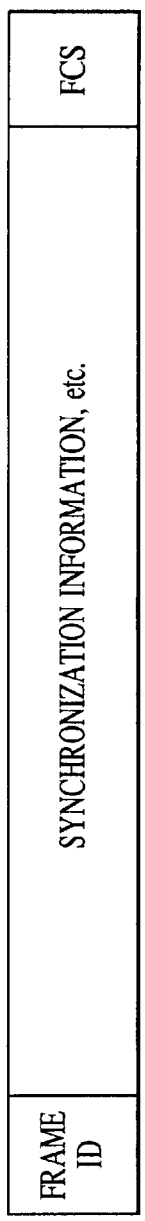
FIG. 10B SYNCHRONIZATION FRAME
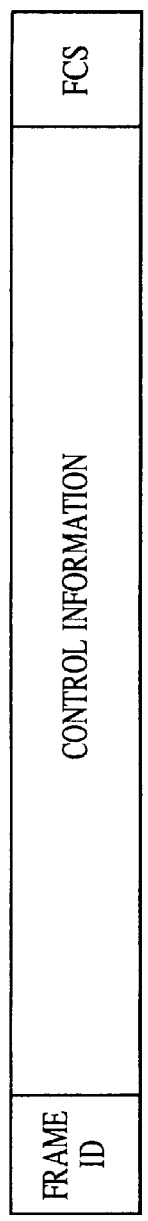
FIG. 10C CONTROL FRAME
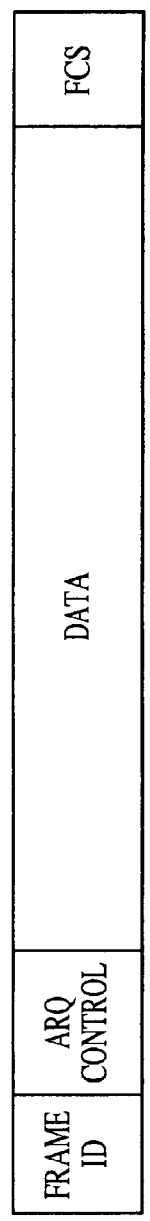
FIG. 10D DATA FRAME
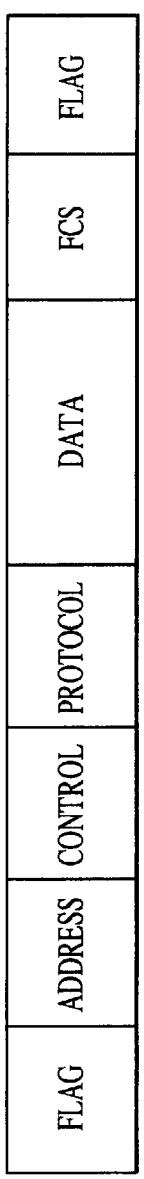
FIG. 11

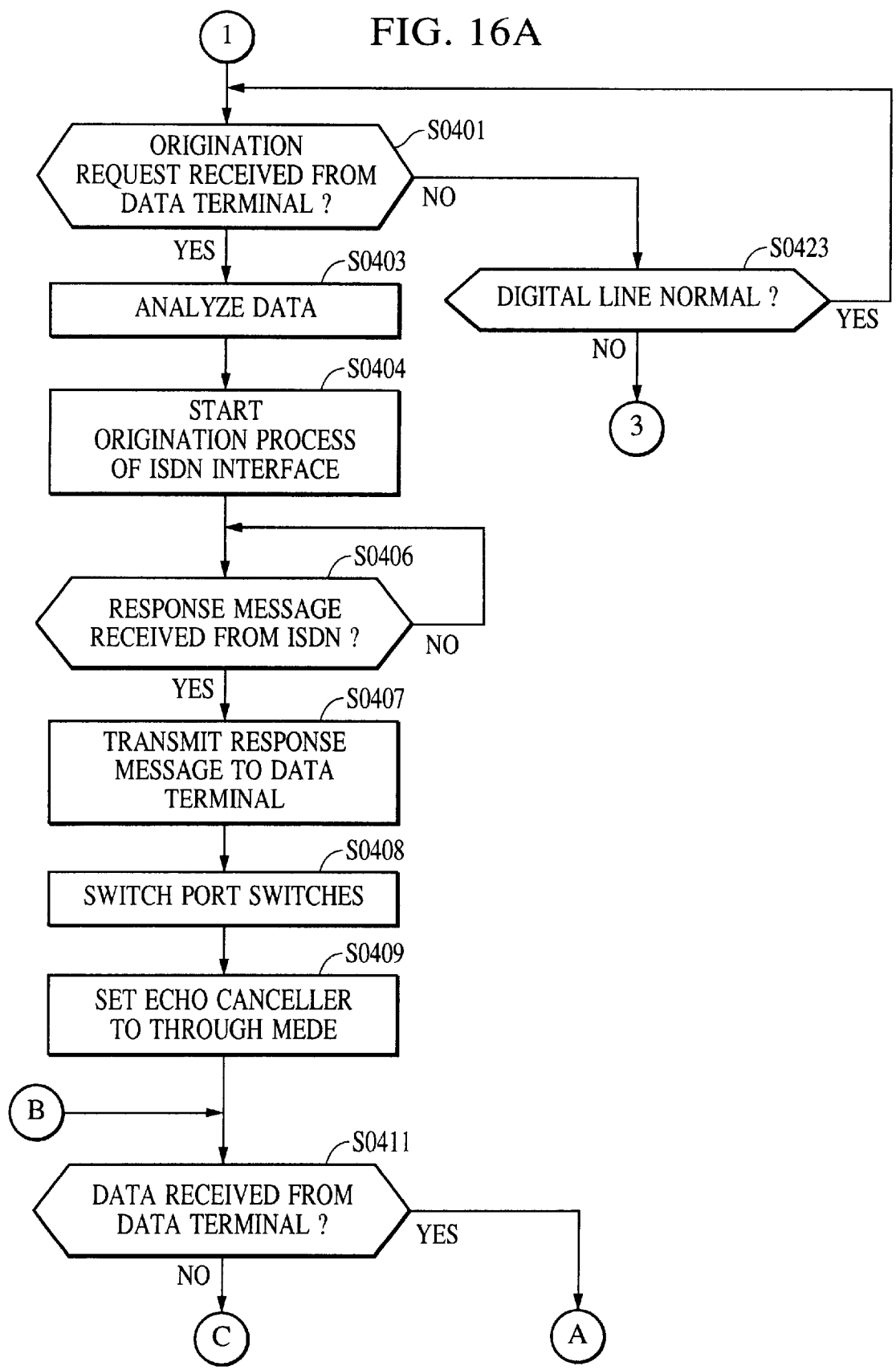

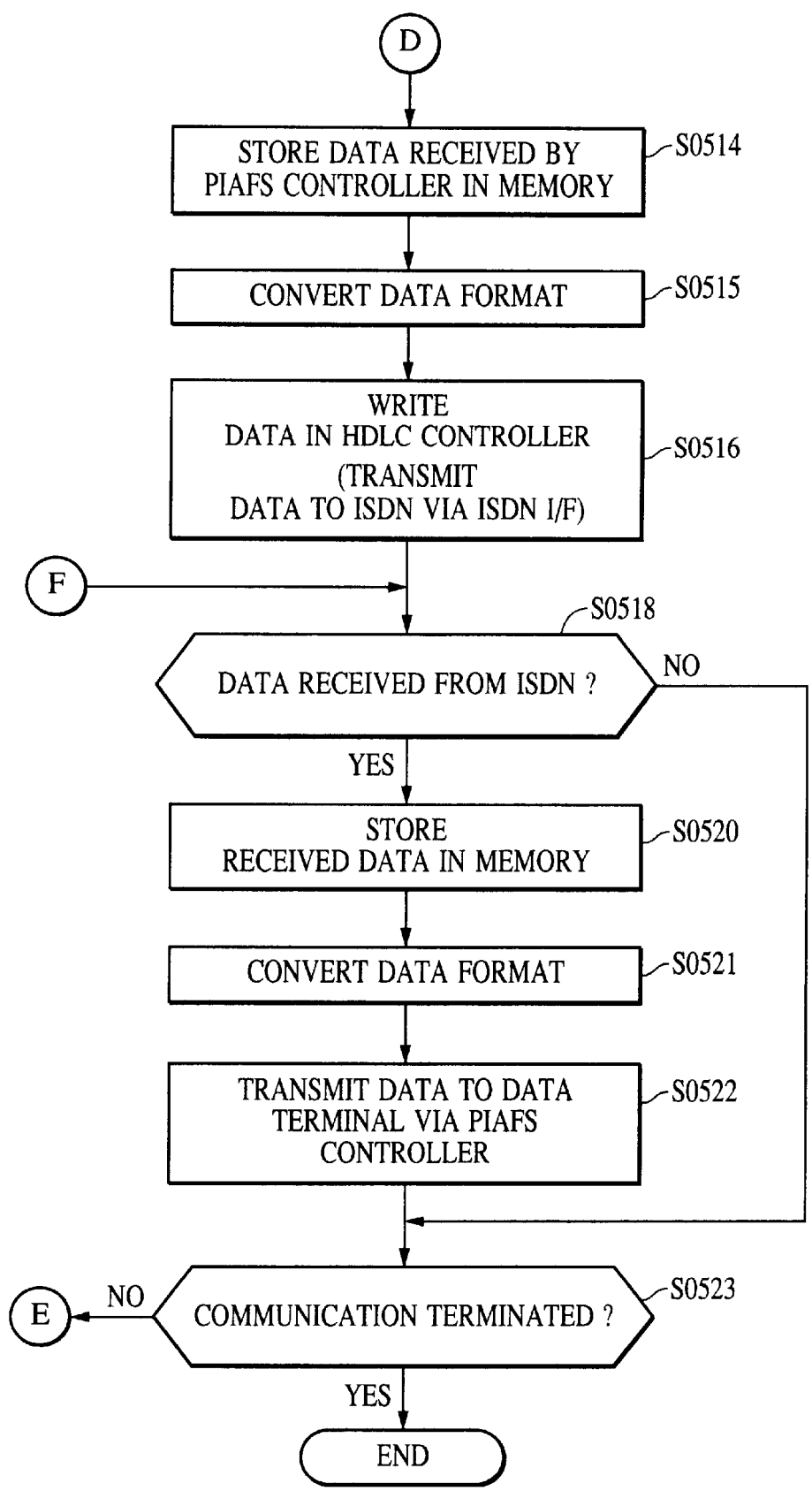

DIGITAL PHASE LOCK LOOP FOR WIRELESS COMMUNICATION AND APPARATUS USING SAME

BACKGROUND OF THE INVENTION

1. Field of the Invention

The present invention relates to a wireless communication apparatus which is connected to a digital line.

2. Description of the Related Art

In recent years, with the widespread use of digital networks, such as ISDN (Integrated Services Digital Network), it has become possible for data terminals, such as personal computers, to be connected to the ISDN via terminal adapters, and data processed by a data terminal can be transmitted and received.

In such a case, a data terminal is connected to a terminal adapter through cables by RS232C, and data is transmitted from a personal computer to the terminal adapter by a start-stop synchronous method at transmission speeds, such as 2400 bps, 4800 bps, 9600 bps, 19.2 kbps, or 38.4 kbps. The terminal adapter receiving the data converts it into a transmission speed of 64 kbps in conformance with V.110, I.460 of the ITU (International Telecommunications Union) standard recommendations and transmits it to the ISDN.

Also, with the widespread use of digital wireless systems, such as a PHS (Personal Handy-phone System), terminals which perform wireless data transmission are put into practical use. In a case in which wireless data transmission is performed using a PHS, in order that retransmission control is performed among terminals, frames of a predetermined format are formed and data transmission is performed.

In Japan, as a PIAFS (PHS Internet Access Forum Standard), a wireless data transmission protocol is standardized. Use of this wireless data transmission protocol makes it possible to realize wireless data communication using data terminals.

Also, by combining the ISDN with the PHS, communication of voice data and various types of data by wire and by wireless via public lines are made possible.

A wireless communication system described in a U.S. patent application (U.S. patent application Ser. No. 100,208, Application date: Jun. 19, 1998) filed by the present inventors is shown in FIG. 27.

As shown in FIG. 27, a PHS base unit 1002, a data terminal 1003, such as a personal computer, and a facsimile apparatus 1004 are connected to an ISDN 1000 via a terminal adapter 1001, and a scanner 1006 and a printer 1007 are connected to the data terminal 1003, so that speech from a PHS telephone set 1005, image data read by a scanner, etc., can be transmitted via the ISDN 1000.

As described above, when data communication is performed via the ISDN 1000, an addition circuit for establishing synchronization with the network (the ISDN 1000) is required, and a synchronization process therefor is performed by the terminal adapter (TA) 1001.

FIG. 28 is a schematic block diagram showing an example of the construction of the TA 1001 for performing a network synchronization process studied by the present inventors.

As shown in FIG. 28, the TA 1001 comprises a CPU 1100, a memory 1101, a bus 1102, an ISDN interface 1103, an HDCL (High-level Data Link Control) controller 1104, a PLL (Phase-Locked Loop) circuit 1105, a low-pass filter 1106, a TCVCXO (Temperature Compensated Voltage Controlled Crystal Oscillator) 1107, a baseband processing section (BBIC) 1108, an RS232C controller 1110, etc.

In a case in which data (including PCM (Pulse Code Modulation)-coded speech) is transmitted and received between a PHS and the ISDN 1000, it is required that the ISDN line 1000 and the PHS wireless line operate in synchronization with each other in order to prevent overrun and underrun of data.

For this reason, in the TA 1001 in FIG. 28, the construction is formed in such a way that synchronization with the network (ISDN 1000) is established by using the PLL circuit 1105, the low-pass filter 1106, and the TCVCXO 1107.

A clock used in the PHS which is a digital wireless communication apparatus connected to the ISDN 1000 requires a very high frequency stability of a frequency of ±3 ppm and a transmission speed accuracy of ±5 ppm in accordance with the standard specification of RCR ST (Research & Development Center for Wireless Systems Standards)-28.

In spite of the fact that the synchronization timing accuracy of the PHS wireless line requires a high accuracy of within ±5 ppm, the accuracy of the synchronization timing clock extracted from the ISDN 1000 is not accurate to the level of ±5 ppm.

Therefore, it can be conceived that the synchronization system comprising the TCVCXO 1107 and the PLL circuit 1105, shown in FIG. 28, corrects a 64 kHz clock 1112 generated by the baseband processing section 1108 by the 64 kHz clock 1112 synchronized with the ISDN 1000 and a 19.2 MHz clock generated by the TCVCXO 1107, so that the TCVCXO 1107 is controlled to operate by this corrected clock.

In the TCVCXO 1107, the output frequency is within 19.2 MHz ±3 ppm regardless of the magnitude of the input voltage.

The baseband processing section 1108 generates a 64 kHz clock 1113 on the basis of the output clock of the TCVCXO 1107. The two clocks, the 64 kHz clock 1113 and the 64-kHz clock (ISDN clock) 1112 synchronized with the ISDN, are input to the PLL circuit 1105.

The PLL circuit 1105 compares the phase of the 64 kHz clock 1113 generated in the baseband processing section 1108 with the phase of the ISDN clock 1112. When the phase of the ISDN clock 1112 leads, a pulse of 5 V is output, and when the phase of the ISDN clock 1112 lags, a pulse of 0 V is output.

The output pulse of the PLL circuit 1105 is smoothed by the low-pass filter 1106, and this smoothed signal is input, as a voltage control signal, to the TCVCXO 1107, allowing the oscillation frequency of the TCVCXO 1107 to be controlled.

More specifically, if the phase of the ISDN clock leads, the control voltage of the TCVCXO 1107 is increased, the output frequency of the TCVCXO 1107 becomes higher, heading toward a direction in which the output of the TCVCXO 1107 and the phase of the ISDN clock 1112 match. Conversely, if the phase of the ISDN clock lags, the control voltage of the TCVCXO 1107 is decreased, and the output frequency of the TCVCXO 1107 becomes lower, heading toward a direction in which the output of the TCVCXO 1107 and the phase of the ISDN clock 1112 match.

The output of the TCVCXO 1107, the synchronization of which with the ISDN clock 1112 is established in this manner, is input to the baseband processing section 1108, and the baseband processing section 1108 generates a 64 kHz clock 1113 on the basis of the output signal of the TCVCXO 1107, with the result that the synchronization between the 64 kHz clock 1113 generated in the baseband processing section 1108 and the ISDN clock 1112 is established.

As described in Japanese Patent Laid-Open No. 7-307969, a digital wireless communication apparatus has been conceived which comprises a first clock source synchronized with the digital network, a second clock source for supplying a clock with an accuracy higher than that of the first clock source, a first speech path unit which operates in synchronization with the first clock source or the second clock source, and a second speech path unit which operates in synchronization with the second clock source, wherein a speech path unit is selected according to whether it is an extension communication or an outside line communication.

In RCR ST-28, it is specified that the absolute accuracy of the frequency stability is ±3 ppm, and the absolute accuracy of the transmission speed indicating the accuracy of burst transmission and reception at intervals of 5 milliseconds between a base station and a mobile station is ±5 ppm.

In the manner as described above, in spite of the specification that the absolute accuracy of the transmission speed is less stringent than the absolute accuracy of the frequency stability, in the TA 1001 in FIG. 28, a clock related to transmission is generated based on a reference frequency having a high accuracy, in which the frequency stability is ±3 ppm.

Therefore, if the TA 1001 is constructed as shown in FIG. 28, for the TCVCXO, an expensive TCVCXO, which is capable of varying the frequency with high accuracy, must be used.

Also, since a phase comparator inside the PLL circuit 1105 used to control the frequency of the TCVCXO by a voltage must convert the result of the phase comparison into an analog voltage value, capacitors and resistors are required externally, and it is impossible to reduce the size of the substrate.

Furthermore, RF modules currently on the market incorporate a TCXO (Temperature Compensated Crystal Oscillator) therein as a standard and can output a reference clock at an accuracy of ±3 ppm, even though it is not variable.

Therefore, in a case in which a TCVCXO is mounted externally, a TCXO mounted as a standard is wasted. Also, omission of the TCXO from an RF module can be conceived, but it is handled in a customized manner and not as a standard, resulting in a high price.

Also, in the digital wireless communication apparatus described in the above-mentioned Japanese Patent Laid-Open No. 7-307969, in spite of the fact that a clock source having an accuracy higher than that of the digital network is mounted, it is necessary to provide a buffer in a section with the ISDN when performing communications via a wireless section.

Furthermore, circuit arrangements and software for controlling a plurality of speech paths become complex, resulting in an expensive product.

In addition, since synchronization with the ISDN is not completely established, data losses, which are not conspicuous during speech communication, occur, causing a problem in that retransmission of frames is necessary and the throughput is decreased during wireless data communication, such as PIAFS.

The above problems are similar to problems which occur in digital wireless systems other than the PHS.

SUMMARY OF THE INVENTION

An object of the present invention is to provide an apparatus for connecting wireless terminals to a digital network at a low cost.

Another object of the present invention is to miniaturize an apparatus for connecting wireless terminals to a digital network.

Another object of the present invention is to improve the quality of communications performed by wireless terminals via a digital network.

The above and further objects, aspects and novel features of the invention will become more apparent from the following detailed description when read in conjunction with the accompanying drawings.

BRIEF DESCRIPTION OF THE DRAWINGS

FIGS. 9A, 9B, and 9C show a PHS wireless transmission frame format;

FIGS. 10A, 10B, 10C, and 10D show a frame format used in a wireless data transmission protocol (PIAFS);

FIG. 11 shows the frame format of PPP;

FIG. 12 is a flowchart showing an operation when the power for an MPU 201 is switched on;

FIG. 13 is a flowchart showing an operation when the power for a CPU of the PHS engine section is switched on;

FIG. 16, including FIG. 16A and FIG. 16B, is a flowchart showing an operation of the MPU 201 during data communication by a data terminal which is connected by wire;

FIG. 17, including FIG. 17A and FIG. 17B, is a flowchart showing an operation of the MPU 201 during synchronous PPP data communication by a data terminal which is connected by wireless;

DETAILED DESCRIPTION OF THE PREFERRED EMBODIMENT

Figure 1:
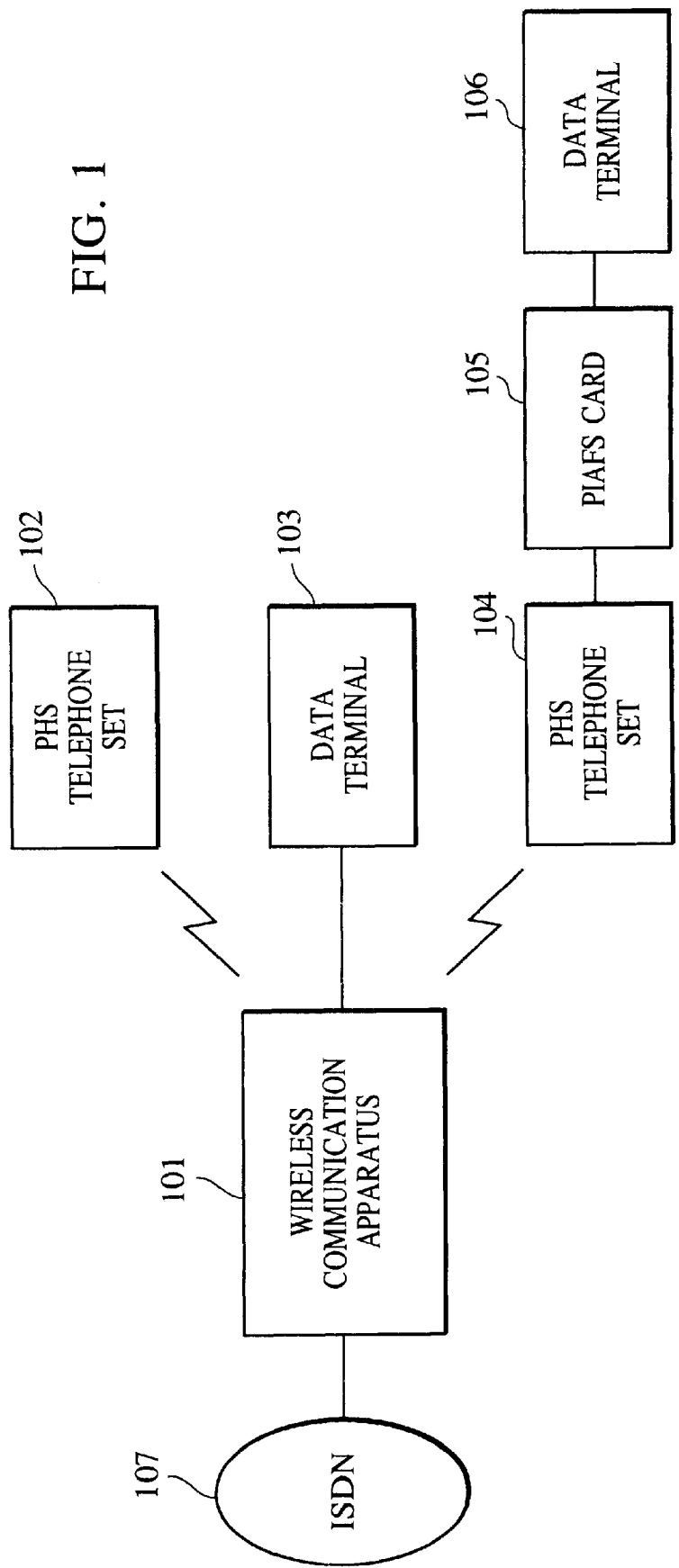
FIG. 1 shows a communication system to which a wireless communication apparatus according to an embodiment of the present invention is applied.

FIG. 1 shows a communication system comprising a wireless communication apparatus 101 according to an embodiment of the present invention.

Referring to FIG. 1, reference numeral 101 denotes a wireless communication apparatus, reference numerals 102 and 104 each denote a PHS telephone set, reference numeral 103 denotes a data terminal, such as a personal computer, which is connected by a wired cable, reference numeral 105 denotes a wireless data transmission protocol (PIAFS) processing card (hereinafter referred to as a "PIAFS card"), reference numeral 106 denotes a data terminal, such as a personal computer, which is connected to the PHS telephone set 104 via the PIAFS card 105, and reference numeral 107 denotes an ISDN as a digital public communication network.

The wireless communication apparatus 101 is incorporated in a composite apparatus having a PHS base unit function, a facsimile function, a printer function, a scanner function, etc. However, the present invention can also be applied to a wireless communication apparatus which does not have a facsimile function, a printer function, or a scanner function.

Also, the number of telephone sets connected to the wireless communication apparatus 101 is not limited to two, and may be one or three or more. Also, the wireless method to be used is not limited to the PHS.

Figure 2:
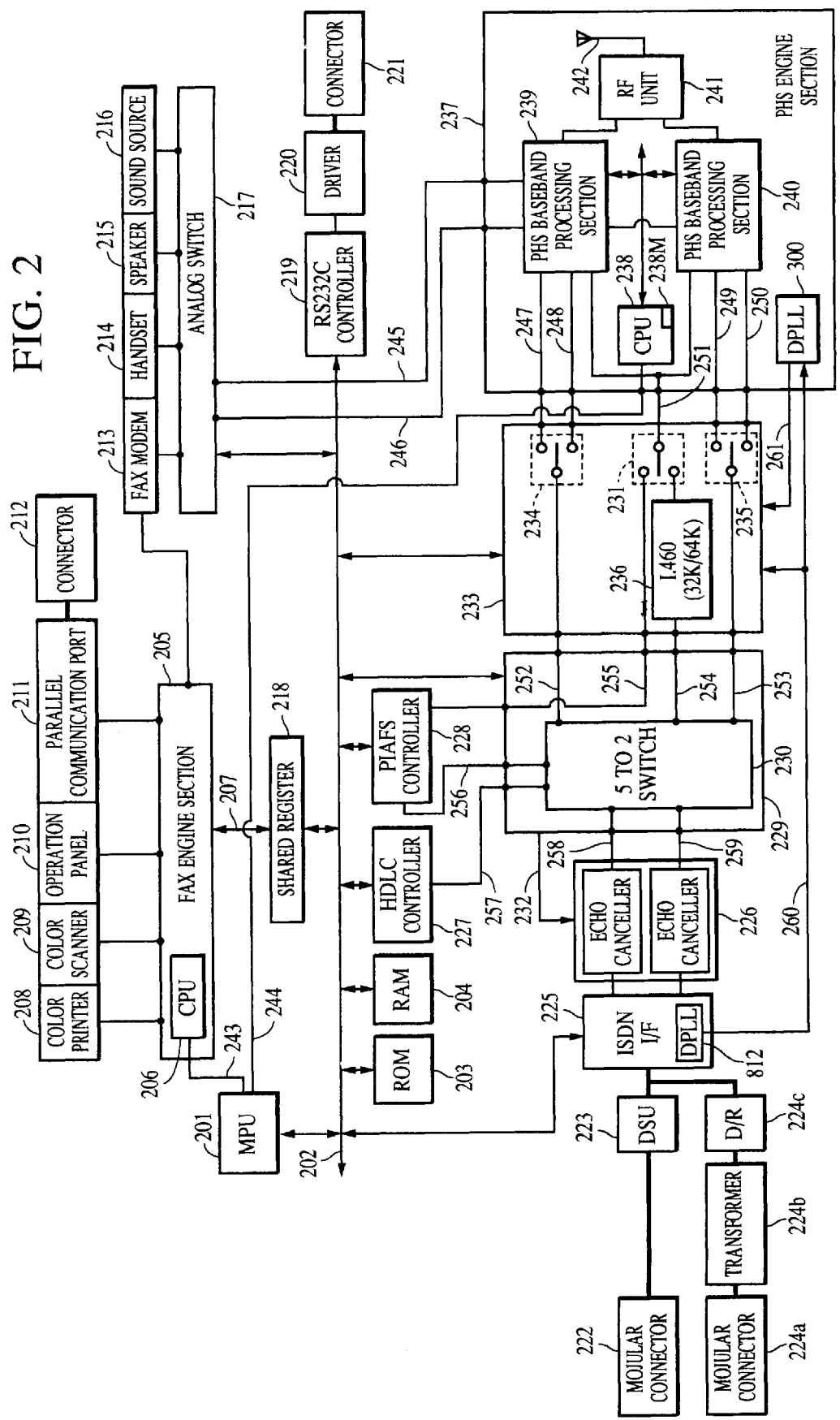
FIG. 2 is a block diagram schematically showing the construction of the wireless communication apparatus according to the embodiment of the present invention.

FIG. 2 is a block diagram schematically showing the construction of the wireless communication apparatus 101.

Referring to FIG. 2, reference numeral 201 denotes a (central processing unit) MPU for controlling the entire apparatus, reference numeral 202 denotes a bus (a data bus and an address bus), reference numeral 203 denotes a ROM in which various programs have been stored, and reference numeral 204 denotes a RAM used as a work area, etc.

Reference numeral 205 denotes a facsimile (FAX) engine section comprising a microcomputer including a CPU 206 for a FAX engine, a ROM and a RAM (both of which are not shown), etc., and an image processing section (not shown). Reference numeral 207 denotes a data bus for the FAX engine section 205. These are connected to devices (reference numerals 208 to 216 described below) required to perform a facsimile operation and are controlled by the MPU 201.

Reference numeral 208 denotes a color printer. Reference numeral 209 denotes a color scanner. Reference numeral 210 denotes an operation panel. Reference numeral 211 denotes a parallel communication interface port. Reference numeral 212 denotes a connector (32 pins) for parallel communication interface. It is possible to print, by the color printer 208, data which is transmitted from the data terminal 103 via this connector 212 for parallel communication interface, and it is possible to transmit an image read by the color scanner 209 to the data terminal 103 via the connector 212 for parallel communication interface.

The present invention can also be applied to a wireless communication apparatus which does not have such a function for performing parallel communication with the data terminal 103.

Reference numeral 213 denotes a FAX modem. Reference numeral 214 denotes a handset. Reference numeral 215 denotes a speaker. Reference numeral 216 denotes a sound source for producing an "on-hold" melody tone, etc. These are controlled by the FAX engine section 205 and are connected to analog switches 217. Then, speech data or analog data for the facsimile is sent, via this analog switch 217, to a PHS baseband processing section 239, whereby the data is converted into a digital signal and is sent to the ISDN 107. Reference numeral 218 denotes a shared register which is used when data is exchanged between a device connected to the data bus 207 of the FAX engine section 205 and a device connected to the bus 202 of the MPU 201. The FAX modem 213 comprises a speech recording section.

Reference numeral 219 denotes an RS232C controller. Reference numeral 220 denotes a driver/receiver for RS232C. Reference numeral 221 denotes an RS232C connector (9 pins). These are connected to the communication port of the data terminal 103 and function as an interface for data which is transmitted and received between the data terminal 103 and the ISDN 107.

In this system, although RS232C is used, it is also possible to use communication interfaces, such as a USB (Universal Serial Bus), an IEEE (the Institute of Electrical and Electronic Enginners, Inc.) 1394, an IrDa (Infrared Data Association), a home bus, etc. The present invention can also be applied to a wireless communication apparatus which does not have such an RS232C controller.

Reference numeral 222 denotes a modular connector for connection with a U point of the ISDN 107. Reference numeral 223 denotes a DSU (Digital Service Unit) for converting data exchanged with an exchange into a signal of a TTL level.

Reference numeral 224a denotes a modular connector for bus connection with an S/T point of the ISDN 107. Reference numeral 224b denotes a transformer. Reference numeral 224c denotes a driver/receiver. The purpose of these is to perform a conversion operation of data of an AMI (Alternate Mark Inversion) code and a TTL level signal, which are exchanged with an ISDN terminal having a function for connection with the S/T point of the ISDN 107 so that a plurality of ISDN terminals are connected by bus and are used. The present invention can also be applied to a wireless communication apparatus which does not have a construction for connecting by bus a plurality of ISDN terminals in the manner as described above.

Reference numeral 225 denotes a T-point interface section of the ISDN 107, which performs control from layer 1 to layer 3 of the ISDN 107, and has a function for inputting and outputting data of channel B of the ISDN 107. The interface section 225 has a DPLL (Digital Phase-Locked Loop) 812 for generating a clock 260.

Reference numeral 226 denotes an echo canceller for removing an echo generated in the ISDN 107. Reference numeral 227 denotes an HDCL (High-Level Data Link Control) controller for assembling and disassembling data of the HDCL format, which is exchanged via the ISDN 107. Reference numeral 228 denotes a PIAFS controller for assembling and disassembling data of a wireless data transmission protocol (PIAFS).

Reference numeral 229 denotes a first port switch, having a 5-2 switch 230, for performing a process for switching data to be transmitted by a channel B1 and a channel B2 of the ISDN 107 under the control of the MPU 201. Reference numeral 232 denotes an echo canceller control signal which is used to perform the operation mode setting of the echo canceller and perform on/off control of the echo canceller operation.

Reference numeral 233 denotes a second port switch, having 2-1 switches 231, 234, and 235, for switching data to be sent to the first port switch 229 under the control of the MPU 201. Reference numeral 236 denotes an I.460 conversion section for performing a data conversion process in accordance with the I.460 standards, which performs a transmission speed conversion process of 32 kbps and 64 kbps and connects PIAFS data from a PHS engine section 237 to the PIAFS controller 228 in the through mode.

Figure 3:
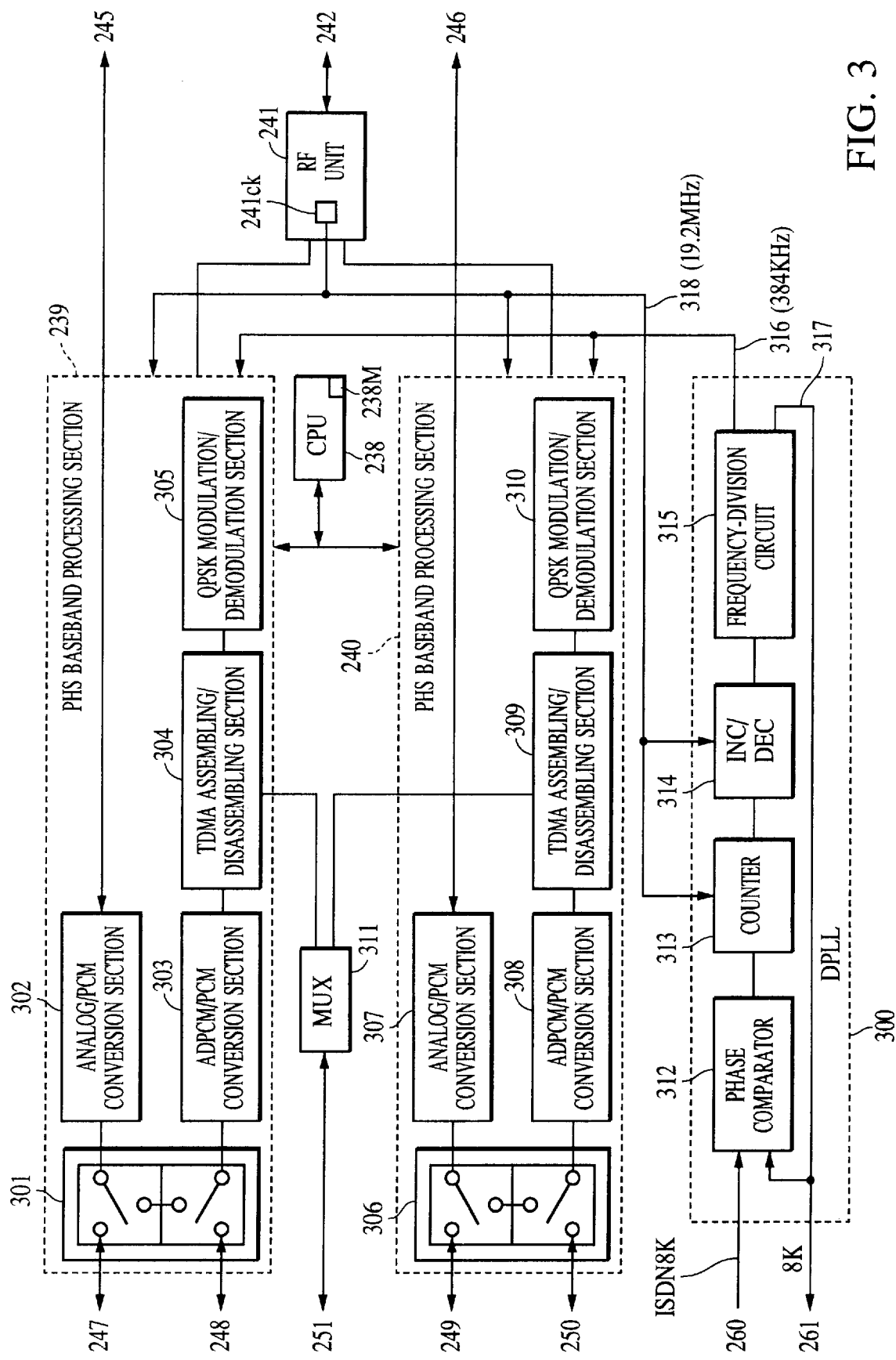
FIG. 3 is a block diagram showing in detail the construction of a PHS engine section.

The PHS engine section 237, comprises a CPU 238 for PHS control, two PHS baseband processing sections 239 and 240 composed of a speech codec section, a wireless transmission frame assembling and disassembling section, a modulation and demodulation section, etc., a high-frequency processing unit 241, an antenna 242, a DPLL 300, etc. The CPU 238 has contained therein a memory 238M for storing programs. An RF unit 241 includes a TCXO 241CK as shown in FIG. 3. The DPLL 300 generates a clock 261, etc.

The PHS engine section 237 converts analog speech and facsimile data which are input and output via the analog switch 217 into PCM (Pulse Code Modulation) data, and allows wireless speech/data transmission of ADPCM (Adaptive Differential Pulse Code Modulation) of 32 kbps of two channels between the PHS telephone sets 102 and 104.

Although this system has two systems of PHS baseband processing sections 239 and 240, a plurality of slots may be controlled by a single baseband processing section.

In a case in which a wireless system other than a PHS is adopted, a circuit in compliant with the adopted wireless system is used instead of the PHS engine section 237, the PIAFS controller 227, etc.

Functions of main signals are described below. Reference numerals 245 and 246 each denote a signal line for an analog signal for connecting the analog switch 217 and the PHS engine section 237 to each other. The analog signals of this signal line are each converted into a PCM signal by a PCM codec inside the PHS baseband processing section 239 and the PHS baseband processing section 240 and is converted into speech data of 32 kbps by an ADPCM codec, is formed into predetermined frames, and is transmitted via the RF unit 241.

Reference numeral 247 denotes a signal line for data of 64 kbps, such that the analog signal from an analog signal line 245 is PCM-converted. Reference numeral 248 denotes a signal line for data of 64 kbps, which is communicated through a first wireless slot. Reference numeral 249 denotes a signal line for data of 64 kbps, such that the analog signal from an analog signal line 246 is PCM-converted. Reference numeral 250 denotes a signal line for data of 64 kbps, which is communicated by a second wireless slot.

The PCM-converted data of 64 kbps of the signal lines 248 and 250 is converted into speech data of 32 kbps by an ADPCM-PCM transcoder inside baseband ICs (PHS baseband processing sections 239 and 240) and is transmitted via an RF unit 242.

Reference numeral 251 denotes a signal line for data of 32 kbps, which is used in non-limit digital communication, and is connected to the port switch 229 via the I.460 conversion section 236 so that the signal line is connected to channel B of the ISDN 107.

Reference numeral 252 denotes a signal line for PCM speech data, which is connected to the PHS baseband processing section 239. Reference numeral 253 denotes a signal line for PCM speech data, which is connected to the PHS baseband processing section 240. Reference numeral 254 denotes a signal line for non-limit digital communication, which is connected to the I.460 conversion section 236, and is connected to the switch 230. Reference numeral 256 denotes a signal line for data of 64 kbps, which is connected to the PIAFS controller 228. Reference numeral 257 denotes a signal line for data of 64 kbps, which is connected to the HDLC controller 227. Reference numeral 258 denotes a signal line for data of 64 kbps, which is transmitted by channel B1 of the ISDN 107. Reference numeral 259 denotes a signal line for data of 64 kbps, which is transmitted by channel B2 of the ISDN 107.

Reference numeral 260 denotes a signal line for supplying clocks of 8 kHz and 64 kHz, which are extracted from the ISDN 107. The signals in the signal lines 258, 259, 247, 248, 249, and 250 are transferred in synchronization with the clock 260 therefor.

Reference numeral 261 denotes a signal line for supplying clocks of 8 kHz and 32 kHz, which are output from the PHS engine section 237, and the signal in the signal line 251 is transferred in synchronization with 8-kHz and 32-kHz signals 261.

FIG. 3 is a block diagram showing in detail the construction of the PHS engine section 237.

Referring to FIG. 3, reference numerals 301 and 306 each denote a switch for switching among the signal lines 245 and 246 connected to the analog switches 217, the signal line connected to the RF unit 241, and the signal lines 247, 248, 249, and 250 connected to the ISDN.

Reference numerals 302 and 307 each denote an analog/PCM conversion section. Reference numerals 303 and 308 each denote an ADPCM/PCM conversion section. Reference numerals 304 and 309 each denote a TDMA assembling/disassembling section for assembling/disassembling wireless transmission frames shown in FIG. 9. Reference numerals 305 and 310 each denote a π/4 QPSK (Quadrature Phase Shift Keying) modulation/demodulation section.

Reference numeral 311 denotes a multiplexer 311 for selecting the PHS baseband processing sections 239 and 240 which are used when wireless data communication is performed.

Inside the PHS baseband processing sections 239 and 240, the switches 301 and 306 are switched by the control of the CPU 238 so that a switching process for switching data transmission paths is performed in various manners according to the situation.

For example, when conversation is made via the ISDN 107 by using the handset 214, an analog signal 245 output from the analog switch 217 is converted into a PCM code in the analog/PCM conversion section 302 and is output to a data line 247.

On the other hand, when conversation is made between the handset 214 and the wireless telephone set 102 (or 104), the speech data converted into a PCM code by the analog/PCM conversion section 302 is input through a switch 301 to the ADPCM/PCM conversion section 303, whereby the PCM code is converted into an ADPCM code, and is assembled into wireless frames by the TDMA assembling/disassembling section 304 and is modulated by the QPSK modulation/demodulation section 305, after which it is transmitted to a wireless line from the RF unit 241.

Also, when speech data from the wireless telephone set 102 (or 104) is sent to the ISDN 107, the signal line 247 is connected to the ADPCM/PCM conversion section 303.

The DPLL 300 is composed of devices, such as a phase comparator 312 for outputting a pulse of a width corresponding to a phase difference, a K counter 313, an increment/decrement circuit 314, a frequency-dividing circuit 315, etc. The DPLL 300 generates a 384kHz clock 316 of an accuracy of ±5 ppm, which is synchronized with an 8-kHz clock (ISDM8K260) extracted from the ISDN 107.

The PHS baseband processing sections 239 and 240 operate by using, as references, the generated 384-kHz clock 316 and a 19.2-MHz clock 318 of an accuracy of ±3 ppm from the TCXO 241CK of the RF unit 241.

More specifically, when data (including speech which is PCM-coded) is transmitted and received between the PHS telephone sets 102 and 104 and the ISDN 107, in order that overrun and underun of data are prevented, it is necessary for the ISDN line and the PHS wireless line to operate in synchronization with each other. On the other hand, the synchronization timing accuracy of a PHS wireless line requires a high accuracy of within ±5 ppm.

Since the accuracy of the synchronization timing clock (ISDN8K260) extracted from the ISDN 107 is within ±5 ppm, the DPLL 300 comprising the phase comparator 312, etc., generates the 384-kHz clock 316 synchronized with the 8-kHz clock (ISDN8K) 260 synchronized with the ISDN 107 so that the PHS baseband processing sections 239 and 240 are made to operate.

The DPLL 300 performs operations such as those described below.

A 8-kHz clock 317 which is frequency-divided by the frequency-dividing circuit 315 and the 8-kHz clock (ISDN8K) 260 which is synchronized with the ISDN 107 are input to the phase comparator 312. Then, the phase comparator 312 outputs a pulse of 5 V to the K counter 313 when the phase of the ISDN clock (ISDN8K) 260 leads and outputs a pulse of 0 V thereto when the other lags according to the phase comparison result.

The K counter 313, which is composed of an up counter and a down counter, outputs a CA (carry) or a BO (borrow) by up-counting or down-counting the reference clock of 19.2 MHz from the RF unit 241 on the basis of the phase information from the phase comparator 312.

This carry or borrow is input to the increment/decrement circuit 314, the reference clock of 19.2 MHz from the RF unit 241 is frequency-divided by two, and when a carry is received, a pulse of a ½ period is inserted into the divided-by-two clock and is output, and when a borrow is received, a pulse for an amount of a ½ period is deleted from the divided-by-two clock and is output.

The frequency-dividing circuit 315 generates a reference clock 316 (384 kHz) of a burst timing inside the apparatus and an internal reference clock 317 of 8 kHz for performing phase comparison with a network synchronization signal (ISDN8K) from the ISDN 107.

In the case of an internal clock mode, the clock of the ISDM8K260 is not input, and in the increment/decrement circuit 314, the reference clock 318 of 19.2 MHz, which is input from the RF unit 241 is frequency-divided by two as it is without performing increasing or decreasing bits, and is output to the frequency-dividing circuit 315. Then, in the frequency-dividing circuit 315, the reference clock which is frequency-divided by two is frequency-divided again as it is, thereby generating a reference clock 316 (384 kHz) of the internal burst timing inside. Also, in the case of the internal clock mode, the internal reference clock 317 of 8 kHz is also not used.

The DPLL 300 may be constructed by using, for example, an SN54/74LS297. Although there are a plurality of QPSK modulation/demodulation sections in FIG. 3, the construction may be formed of one QPSK modulation/demodulation section if the TDMA assembling/disassembling sections 304 and 309 correspond to a plurality of slots.

Figure 4:
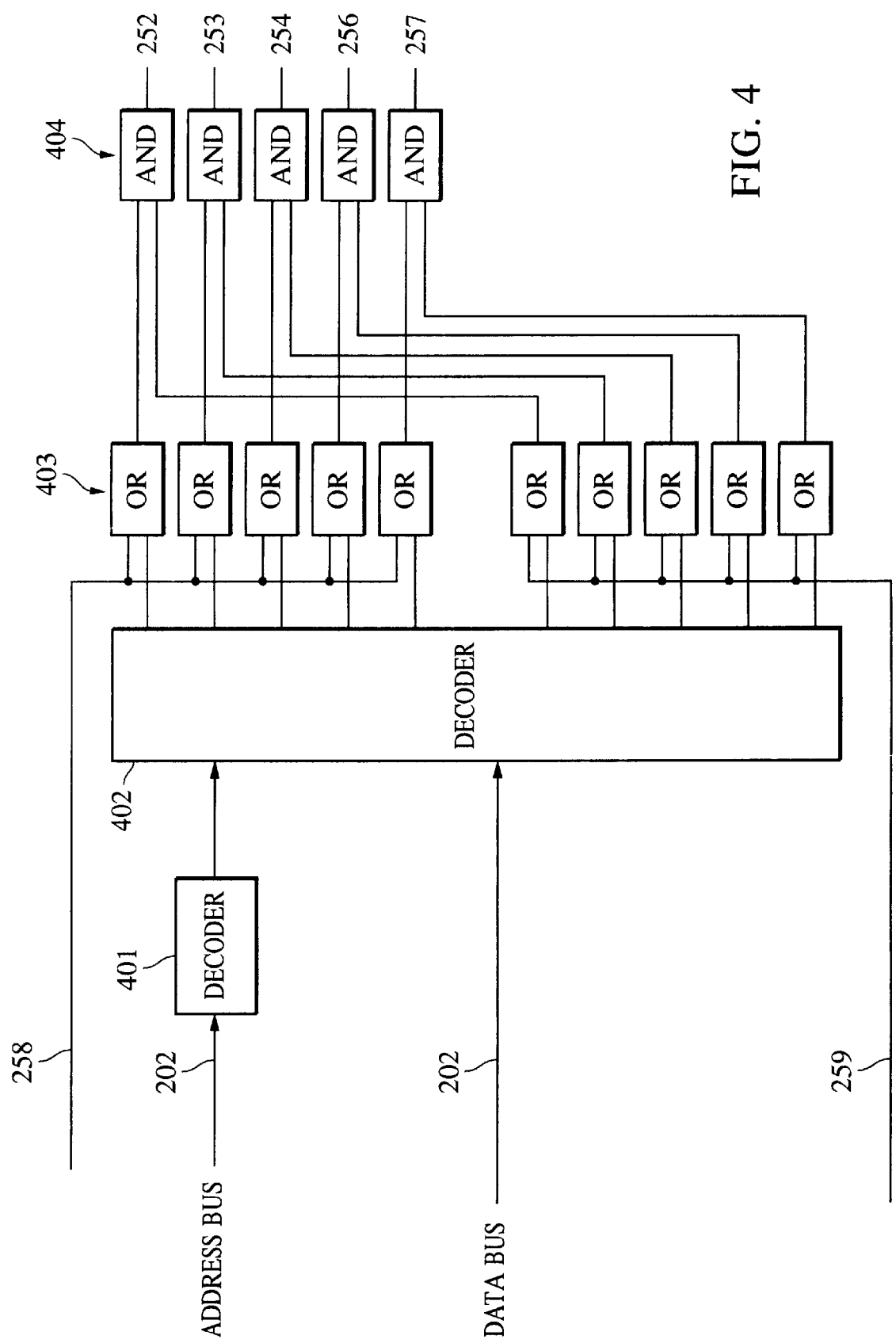
FIG. 4 is a block diagram showing in detail the construction of a receiving system of a first port switch.
Figure 5:
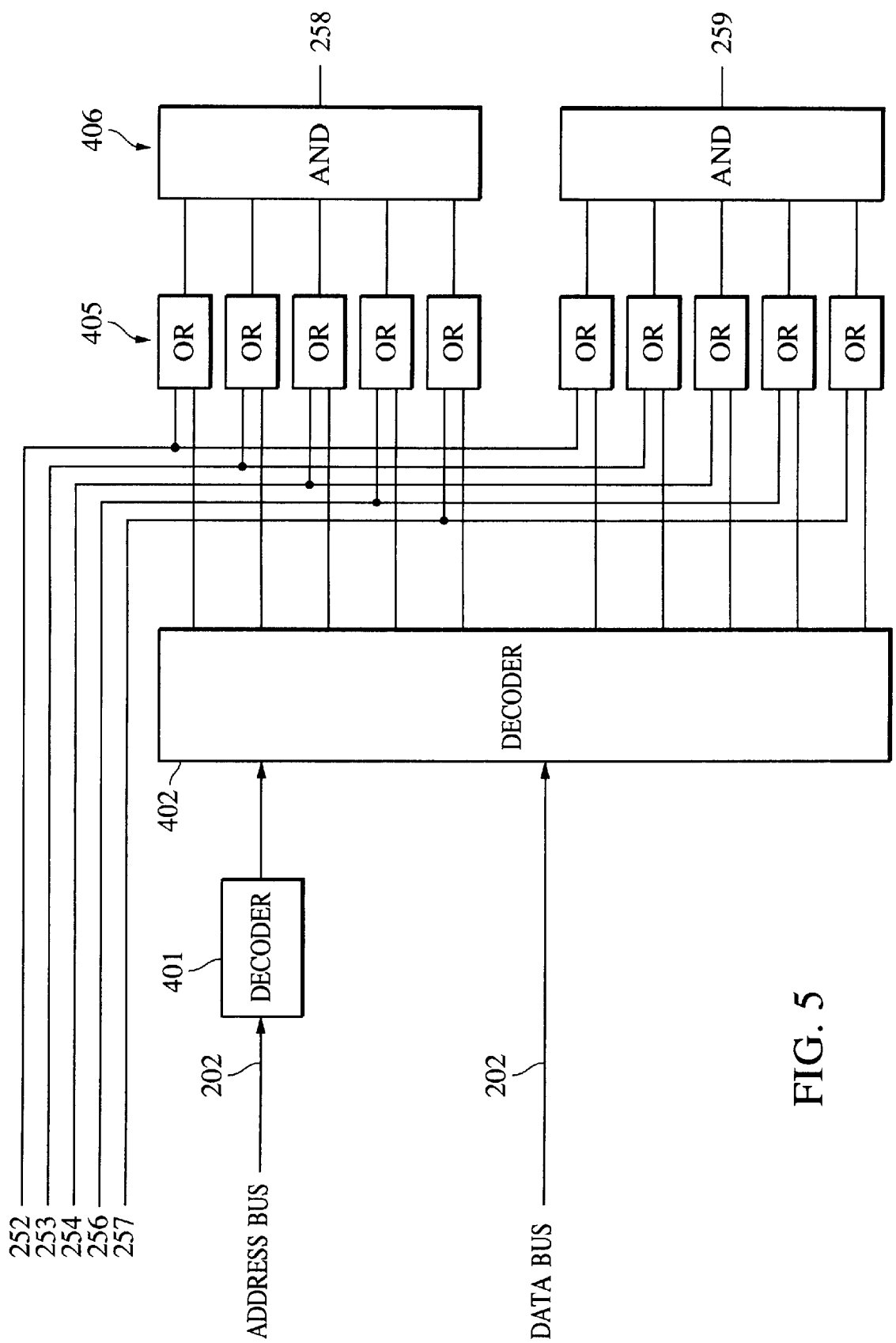
FIG. 5 is a block diagram showing in detail the construction of a transmission system of the first port switch.

FIGS. 4 and 5 are block diagrams showing in detail the construction of the switch 230 shown in FIG. 2.

In FIGS. 4 and 5, reference numerals 401 and 402 each denote a decoder, reference numerals 403 and 405 each denote an OR gate, and reference numerals 404 and 406 each denote an AND gate.

FIG. 4 shows constituent elements in the switch 230 for connecting data of channel B1 and channel B, which is received from the ISDN 107, to one of the three signal lines 252, 253, and 254 connected to the HDLC controller 227, the PIAFS controller 227, and the PIAFS controller 228.

When the MPU 201 writes a predetermined value into the address assigned to the switch 230, the switch 230 decodes the value by a decoder 402, thereby outputting an L level (0 V) to only the OR gate 403 connected to the signal lines 252, 253, 254, 256, and 257 corresponding to the other party to which the signal lines 258 and 259 should be connected, and outputting an H level (5 V) to the other OR gate 405. Therefore, the data of the signal lines 258 and 259 is input only from the selected OR gate 403 to the AND gate 404, and as a result, the signal lines 258 and 259 are each connected to one of the five signal lines.

FIG. 5 shows constituent elements in the switches 230, for connecting one of the three signal lines 252, 253, and 254 connected to the PHS engine section 237, the HDLC controller 227, and the PIAFS controller 228 to the transmission signal lines of channel B1 and channel B of the ISDN 107.

When the MPU 201 writes a predetermined value into the address assigned to the switch 230, the switch 230 decodes the value by a decoder 402, thereby outputting an L level (0 V) to only the two OR gates 405 corresponding to the signal lines 252, 253, 254, 256, and 257 which should be connected to the transmission signal lines of channel B1 and channel B2 of the ISDN 107 and outputing an H level (5 V) to the other OR gate 405. As a result, one of the five signal lines is connected to the signal line 258 connected to the channel B1 of the ISDN 107, and one of them is connected to the signal line 259 connected to the channel B2 of the ISDN 107.

Figure 6:
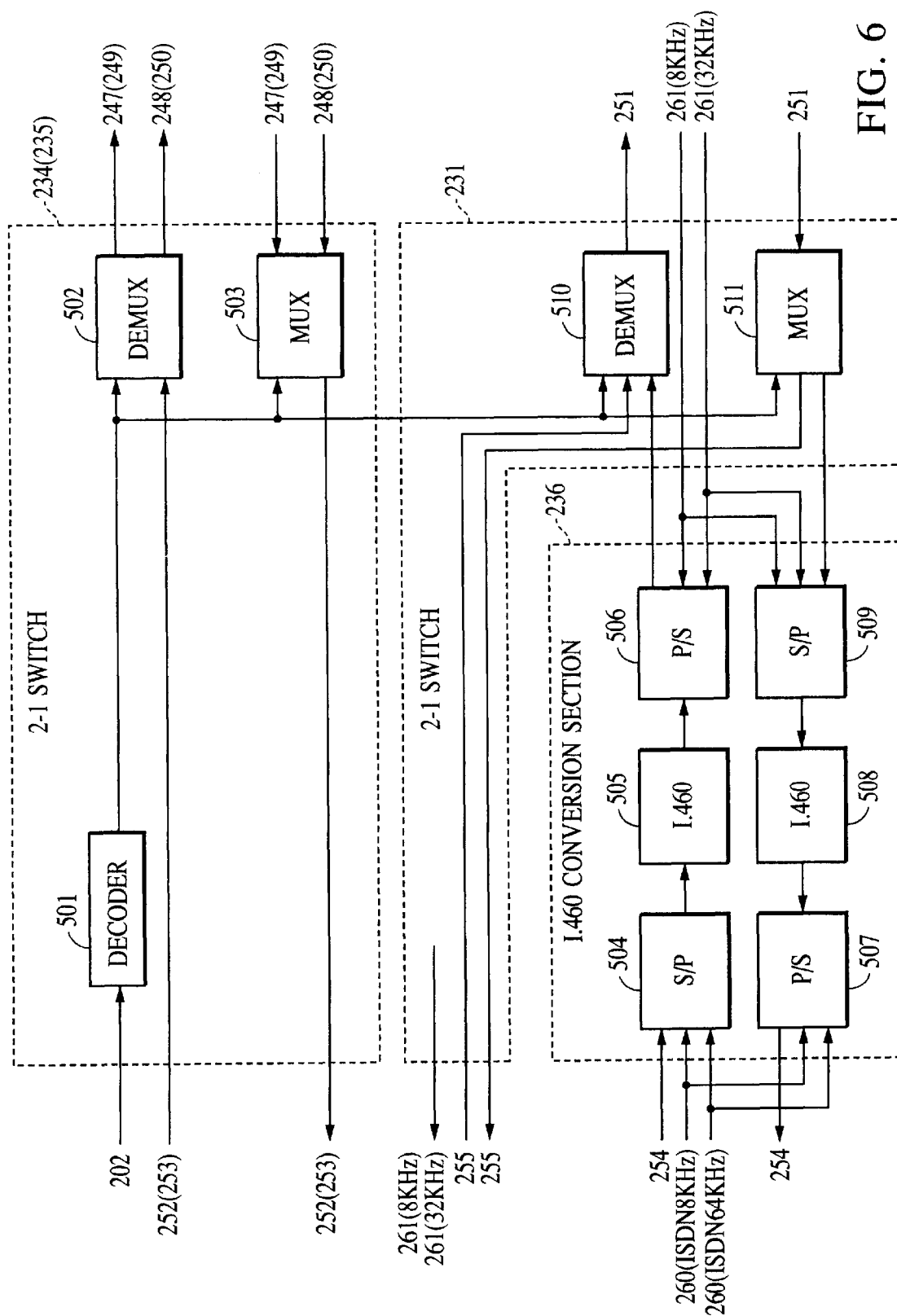
FIG. 6 is a block diagram showing in detail the construction of a second port switch.

FIG. 6 is a block diagram showing in detail the construction of the port switch 233.

In FIG. 6, reference numeral 501 denotes a decoder for generating a signal for controlling selection circuits 502, 503, 510, and 511.

Reference numeral 502 denotes a selection circuit for switching between converting serial data into an analog signal and outputting the serial data to a wireless line, and the selection circuit is controlled by the MPU 201 via the decoder 501. The output of this selection circuit 502 is input, as data 247 (249) or data 248 (250), to the PHS engine section 237.

Conversely, for the data 247 (249) or data 248 (250), output from the PHS engine section 237, a selection is made by the selection circuit 503 as to whether the analog signal is converted into a PCM signal or a signal from the wireless section is converted into a PCM signal, and is output as a data signal 252 to the port switch 229 in synchronization with a synchronization signal 260 from the network.

Reference numeral 510 denotes a selection circuit for switching between outputting a PIAFS frame signal of 32 kbps from the PIAFS controller 228 to the wireless line and outputting a PIAFS frame signal from the ISDN 107 to the wireless line, which selection circuit is controlled by the MPU 201 via the decoder 501. The output 251 of the selection circuit 510 is input to the PHS engine section 237.

Also, reference numeral 511 denotes a selection circuit 511 for switching between outputting data output from the PHS engine section 237, as a PIAFS frame signal of 32 kbps, to the PIAFS controller 228, and outputting the data, as an I.460-converted PIAFS frame signal, to the ISDN 107, which selection circuit is controlled by the MPU 201 via the decoder 501.

When the signal from the PHS engine section 237 is output to the ISDN 107, the I.460 conversion section 236 performs a 32-kbps to 64-kbps conversion process. In this case, the parallel-to-serial conversion section 507 and the serial-to-parallel conversion section 509 inside the I.460 conversion section 236 operate in accordance with the 8-kHz clock timing clock 260 and the 32-kbps clock timing 261.

The data input from the PHS engine section 237 in synchronization with the 32-kHz clock 261 is converted into 4-bit parallel data in the serial-to-parallel conversion section 509, and a 4-bit dummy pit is inserted thereto, and the data is input as 8-bit data to an FIFO 508. The parallel-to-serial conversion section 507 extracts the 8-bit data inside the FIFO 508, as a serial signal, in synchronization with the clock 260 of 64 kHz, produced by the ISDN 107, and outputs it to the ISDN 107.

Also, the PCM data input from the ISDN interface 225 is converted by a serial-to-parallel conversion section 504 into parallel data in synchronization with the clock 260 of 64 kHz, and is written into an FIFO 505. In a parallel-to-serial conversion section 506, predetermined four bits are deleted, and the data is sent, as serial data, to the PHS engine section 237 in synchronization with the clock 261 of 32 kHz from the PHS engine section 237.

Also, when the signal from the PHS engine section 237 is output to the PIAFS controller 228, this is performed by switching the data and the clock by the selection circuits 510 and 511.

The phase and the rise of the synchronization signal (8 kHz) 261 input from the PHS engine section 237 to the I.460 conversion section 236 are completely synchronous with those of the synchronization signal (ISDN 8 kHz) from the ISDN 107 when the clock of the PHS engine section 237 is synchronized with the ISDN 107.

However, when this system is not connected to the ISDN 107, the I.460 conversion section 236 is not used, and assuming that all the data passing through this path is PIAFS data, the synchronization signal 261 and the data 251 are transferred to the PIAFS controller 228.

Figure 7:
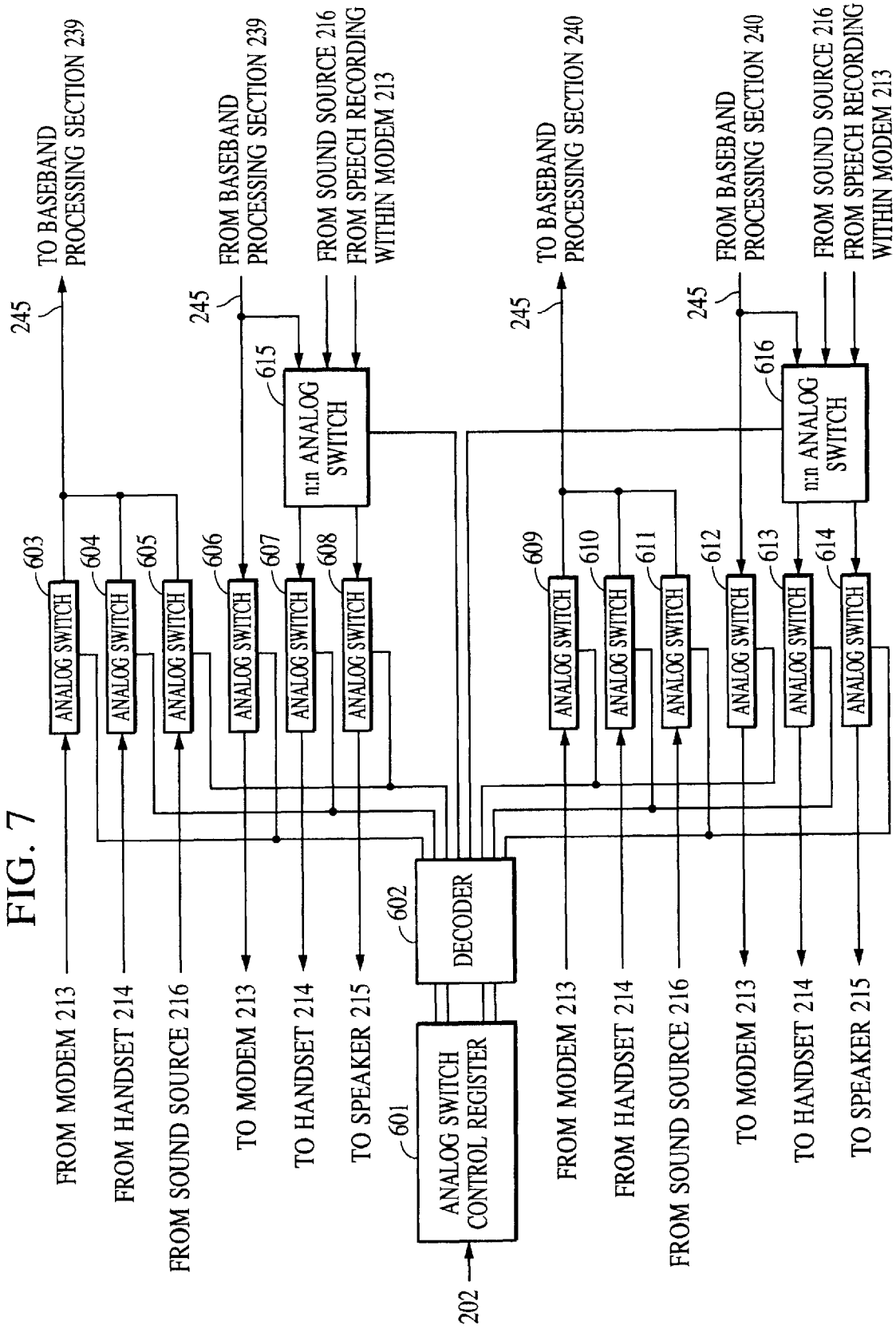
FIG. 7 is a block diagram showing in detail the construction of analog switches.

FIG. 7 is a block diagram showing in detail the construction of the analog switch 217.

In FIG. 7, reference numeral 601 denotes a register for controlling the analog switch 217, into which register data is written by the MPU 201 via the data bus 202. Reference numeral 602 denotes a decoder, which decodes the data written into the register 601 and which generates a signal for controlling analog switches 603 to 614 and n-to-n analog switches 615 and 616.

Each analog switch 603 to 614 is composed of an input pin, an output pin, and a control pin. When the control pin is at a low level, the input pin and the output pin are connected to each other, and when the control pin is at a high level, the input pin and the output pin are disconnected from each other. The n-to-n analog switches 615 and 616 perform control such that the signal outputs of the PHS baseband processing sections 239 and 240, the sound source 216, and the FAX modem 213 are correctly sent to either the handset 214 or the speaker 215.

The data sent to the PHS baseband processing sections 239 and 240 is selected by the analog switches 603 to 614 from the output signal from the FAX modem 213, the speech signal input from the handset 214, and the melody tone from the sound source 216 under the control of the MPU 201. Specifically, when FAX communication is to be performed, the FAX modem 213 is connected, and when handset conversation is performed, the handset 214 is connected, and the sound source 216 is connected during holding.

Conversely, during the FAX communication, the data output from the PHS baseband processing sections 239 and 240 is input to the FAX modem 213, and during conversation, the n-to-n analog switches 615 and 616 are switched so that the speech signals output from the PHS baseband processing sections 239 and 240 are output to the handset 214 and the 215. During holding, the signal which is output from the sound source 216 is connected to the handset 214 and the speaker 215. When the speech recorded in the speech recording section inside the FAX modem 213 is to be heard, the signal output from the FAX modem 213 is sent to the handset 214 and the speaker 215 and is used.

In the manner as described above, a plurality of types of analog signals are switched according to the operation mode and are input to the PHS baseband processing sections 239 and 240 so that communication can be performed in the ISDN 107 and the wireless line. The analog switches 603 to 614 may be formed by using analog switches, such as a well known switch 74HC4053, or commercially available cross-point switches.

Figure 8:
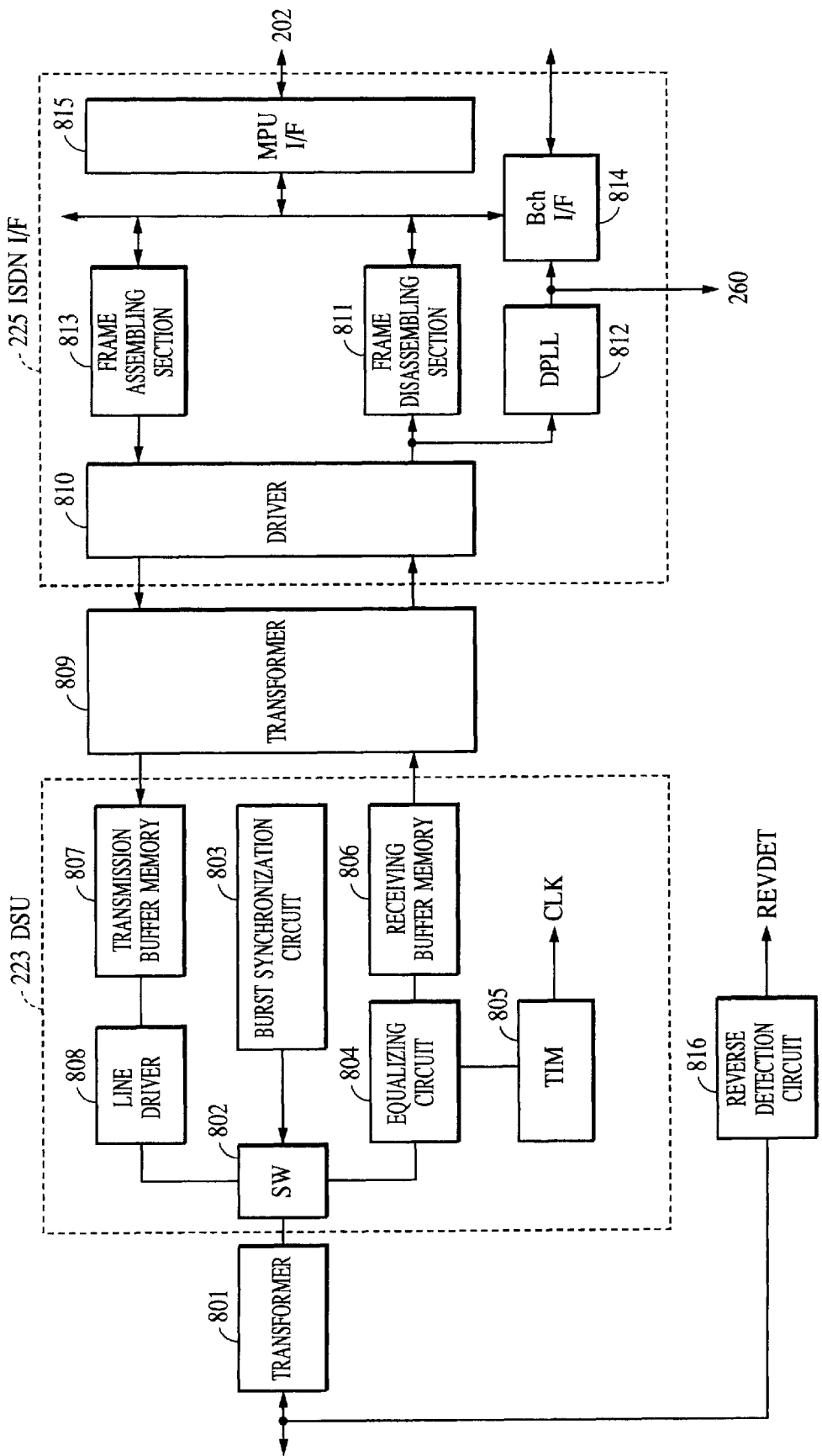
FIG. 8 is a block diagram showing the construction of a DSU 223 and a T-point interface circuit 225.

FIG. 8 is a block diagram showing the hardware construction of a DSU 223 which is a U-point circuit and an ISDN interface section 225 which is a T-point circuit in this system.

The U-point interface has a transformer for separating DC components from the ISDN 107 and a buffer for transmission and reception provided therein. Both-direction transmission of 144 kbps is performed while establishing synchronization with the ISDN 107 by using a two-wire balanced cable by a Ping-Pong transmission (TCM: Time Compression Multiplexing Transmission) method, and data transmission and reception to and from the T-point side are performed through an interface of a total of four wires by using two wires for both transmission and reception by an AMI (Alternated Mark Inversion) code.

The frame of Ping-Pong transmission is composed of 20-word information and frame bits, a monitor bit, and a DC balance bit. The AMI code is defined by the interface of the INS network services.

The DSU 223 which is a U-point circuit, comprises a switch 802, which is connected to a transformer 801 for making both-way transmission possible between the ISDN exchange 107 and this system via a two-wire metallic cable by a Ping-Pong transmission method, for performing switching of burst transmission and reception in a Ping-Pong transmission, a burst synchronization circuit 803 for generating a timing of burst transmission and reception, an equalizing circuit 804 for removing the reflected components of a received pulse so as to maintain the frequency characteristics of the cable at constant, a TIM 805 for generating a timing signal for performing frame synchronization and user synchronization from an AMI code, a receiving buffer memory section 806 for temporarily buffering data of 2B+D, sent by Ping-Pong transmission, from the exchange 107 and for outputting it in the structure of AMI-coded frames of a basic interface, to the T-point circuit, a transmission buffer memory 807 for disassembling AMI-coded frames of the basic interface from the T-point circuit and for buffering data of a 2B signal a D signal, and a line driver 808 for assembling the data of 2B+D into predetermined frames and transmitting them so that the data stored in the transmission buffer memory 807 is transmitted to the exchange. Also, reference numeral 816 denotes a reverse detection circuit for detecting a reverse signal from the ISDN 107 and for outputting a reverse detection signal REVDET.

The T-point interface receives an AMI code from the U point, disassembles data of channel 2B+D on the basis of the frame bits in the received frames, and outputs the received data of channel B to the speech path. Also, synchronization of the phase is established in the inside from the received AMI code, and a synchronization signal is sent to the speech path. Also, the data in the speech path, which is received in synchronization with the sent synchronization signal, is assembled into frames of an AMI code, and these frame are sent to the U-point interface.

The T-point interface 225 comprises a driver 810, which is connected to a line transformer 809 for allowing disconnection with the U point, for transmitting and receiving a basic interface frame, a frame disassembling section 811 for disassembling an AMI-coded signal received from the U point and for buffering it in a memory for each of channel B and channel D, a DPLL circuit 812 for generating reference clocks (64 kHz and 8 kHz) used in the speech path of the system from the received AMI-coded signal, a frame assembling section 813 for assembling the data signal from a Bch interface 814 (to be described later) or the data signal from a CPU interface 815 into basic interface frames which are AMI-coded so as to be transmitted to the U point, the Bch interface 814 for sending the PCM transmission and reception signal from the echo canceller 226 to the frame assembling section 813 in synchronization with the synchronization signal 260 and for outputting the data disassembled by the frame disassembling section 811 to the speech path (echo canceller 226) in synchronization with the synchronization signal 260, and an MPU interface 815, which is connected by the MPU 201 and the bus 202, for performing control of the T-point circuit.

The DPLL circuit 812 has contained therein a waveform conversion circuit, which converts an AMI code signal into two RZ (Return Zero) signals by two positive and negative comparators and combines these two signals by logic OR, thereby generating a reference clock of 192 kHz. Furthermore, the DPLL circuit 812 generates a clock of 8 kHz, as a reference synchronization signal of the speech path, by frequency-dividing by 24 this clock of 192 kHz and generates a clock of 64 kHz by frequency-dividing the clock of 192 kHz by 3.

When this system is connected to the ISDN 107, the MPU 201 can know, via the MPU interface 815 and the CPU interface 202, whether the DPLL circuit 812 has been locked to the clock of the ISDN.

Although in this embodiment, the synchronization signals are formed of 8-Hz and 64-kHz signals, in addition, when the clock from the ISDN 107 is directly used as a signal for synchronization, a combination of a signal of 192 kHz or 384 kHz and a signal of 8 kHz may be used as a synchronization signal.

Also, when connection to a digital network other than the ISDN is made, the clock is extracted by a method in conformance with a connected network.

FIGS. 9A, 9B, and 9C show a PHS wireless transmission frame format. FIG. 9A shows an SCCH (individual cell call) used when a wireless link is to be established. FIG. 9B shows a PCH (Paging Channel: broadcasting channel). FIG. 9C shows frames of a TCH (Traffic Channel: information channel), an FACCH (Fast Associated Control Channel), etc.

FIGS. 10A, 10B, 10C, and 10D show a frame format used in a wireless data transmission protocol (PIAFS). FIG. 10A shows a negotiation frame which is transmitted and received to select a protocol and to establish frame synchronization. FIG. 10B shows a synchronization frame which is transmitted and received to establish resynchronization during communication. FIG. 10C shows a control frame for transmitting and receiving control information. FIG. 10D shows a data frame for transmitting and receiving user data.

When data communication by PIAFS is performed, initially, in-band negotiation, frame synchronization establishment, response delay time measurement, etc., are performed by using a negotiation frame. Next, setting of communication parameters is performed by a control frame, and data communication by data frames is started.

FIG. 11 shows a frame format of PPP (Point-to-Point Protocol). In FIG. 11, a flag is a pattern of 01111110 indicating the start and the end of the frame, the address is a fixed pattern of 11111111, the control is a fixed pattern of 00000011, the protocol is 2-byte data indicating the type of a network layer protocol to be used, the data is variable-length transmission information containing PPP control data and user data, and an FCS (Frame Check Sequence) is a data error detection code.

For the above frame formats, formats used in the adopted communication system may be used.

Next, a description is given of the operation in various operation modes and the flow of data in this wireless communication apparatus 101 by referring to FIGS. 12 to 26. The programs corresponding to the flowcharts of FIGS. 12 to 26 have been stored in a program memory, the ROM 203, and a ROM contained in the CPU 238.

Initialization Process by the MPU 201 When Power is Switched on

Figure 12:
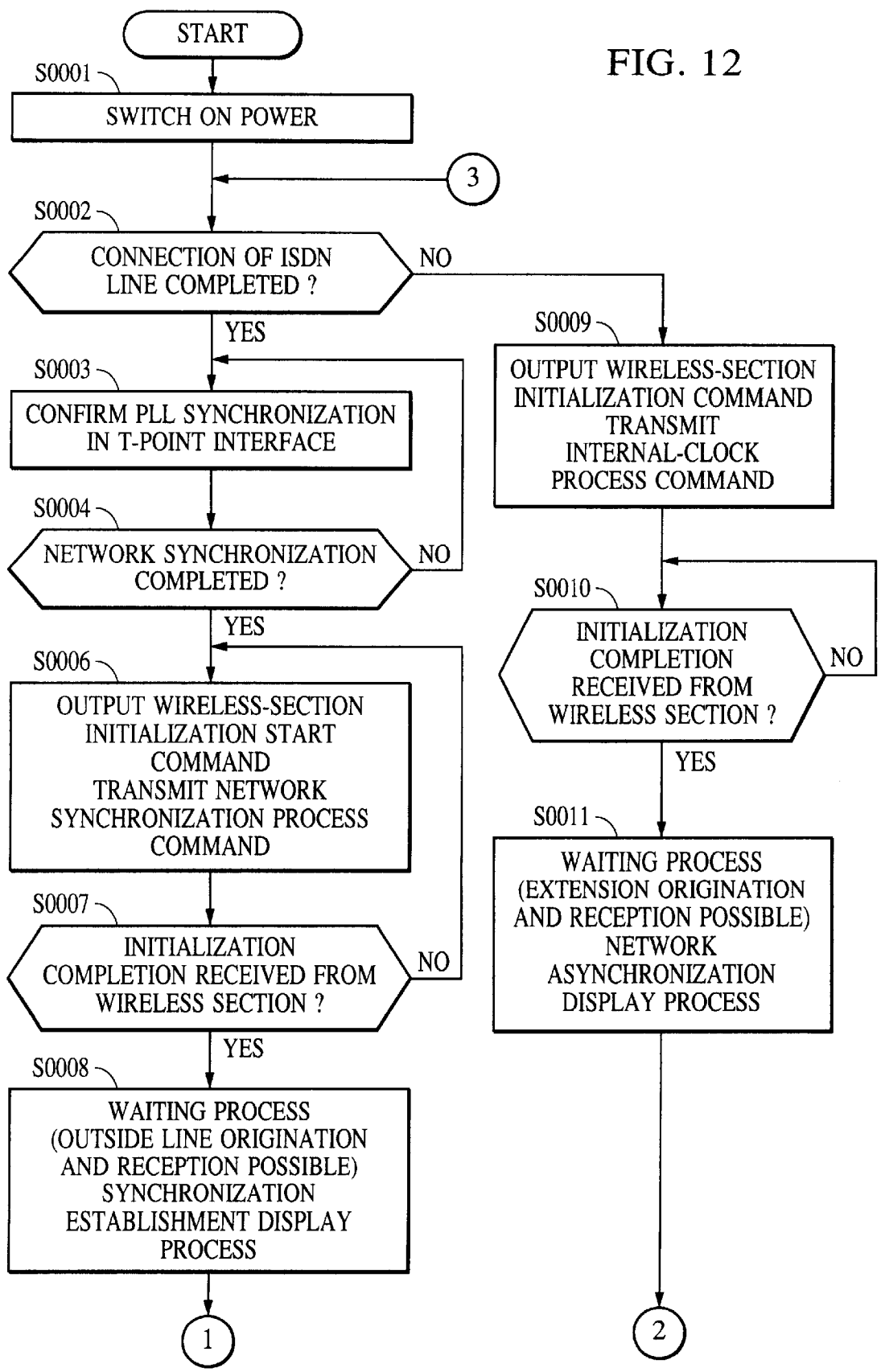

When the power for the wireless communication apparatus 101 is switched on, the MPU 201 performs an operation shown in the flowchart in FIG. 12 in accordance with a program stored in the ROM 203.

More specifically, when electrical power is supplied to the main unit, the MPU 201 secures a work area of the RAM 204 and performs an initialization process for the constituent elements (ICs) (step S0001). When the initialization process is terminated, connection with the ISDN 107 is confirmed on the basis of a reverse signal from the ISDN 107, detected at the U point (DSU) 223 (step S0002). The detection in this step S0002 can be determined based on a reverse detection signal REVDET from the reverse detection circuit 816.

When the connection with the ISDN 107 is confirmed, it is confirmed whether the synchronization with the ISDN 107 has been established in the T-point interface 225 (step S0003). When the synchronization has been established, normal 64-kHz and 8-kHz signals are output to the synchronization signal line 260 from the DPLL circuit 812, whereas in the CPU interface 815, a bit indicating that synchronization has been established is turned on by the DPLL circuit 812.

When it is confirmed that the synchronization with the ISDN 107 has been established (step S0004), a clock 260 for speech path is output from the DPLL circuit 812 of the T-point interface 225. When the clock 260 for speech path is output, the MPU 201 sends an initialization start command to the PHS engine section 237 so that a process synchronized with the output clock 260 is performed (step S0006). In accordance with this instruction, the DPLL 300 of the PHS engine section 237 outputs clocks 316 and 317 in accordance with the clock 260 and a clock 318 from the RF unit 241.

Thereafter, when an initialization completion signal of the wireless section is received from the PHS engine section 237 (step S0007), assuming that origination and reception to and from the wireless line are possible, the information that the synchronization has been established is displayed on the display section of the operation panel 210, and a waiting process is started.

As the above display process, turning on of an LED or a display on an LCD display section can be conceived. Also, it is also conceived that information that the synchronization has been established is notified by voice guidance by the sound source 216 at the same time. In this case, the analog switch 217 is switched on so that a voice guidance signal in the sound source 216 is output to the speaker 215.

When the connection with the ISDN 107 has not been completed (step S0002), a command is transmitted to the PHS engine section 237 so that a process in accordance with the internal clock 241CK of the PHS engine section 237 is performed (step S0009). In accordance with this command, the DPLL 300 of the PHS engine section 237 operates in the internal clock mode, and a clock 316 is generated by frequency-dividing the clock 318 from the RF unit 241.

Then, when an initialization completion signal is received from the PHS engine section 237 (step S0010), assuming that only extension communication is possible, the PHS engine section 237 causes the operation panel 210 to produce a display that a process at asynchronization time is in progress and performs a waiting process.

This display process can be performed by turning on an LED or a display on an LCD display section. Also, it is possible to output voice guidance from the sound source 216 to inform that the synchronization has not been established at the same time. In this case, the analog switch 217 is switched on so that a voice guidance signal in the sound source 216 is output to the speaker 215.

Whether or not the connection with the ISDN 107 has been completed in this process can be confirmed by detecting a reverse signal by the reverse detection circuit 816 in the U-point interface. Also, since connection with the line is often not made immediately after the power is switched on, the incidence of the connection confirmation process is increased.

Initialization Process by CPU 238 When Power is Switched on

Figure 13:
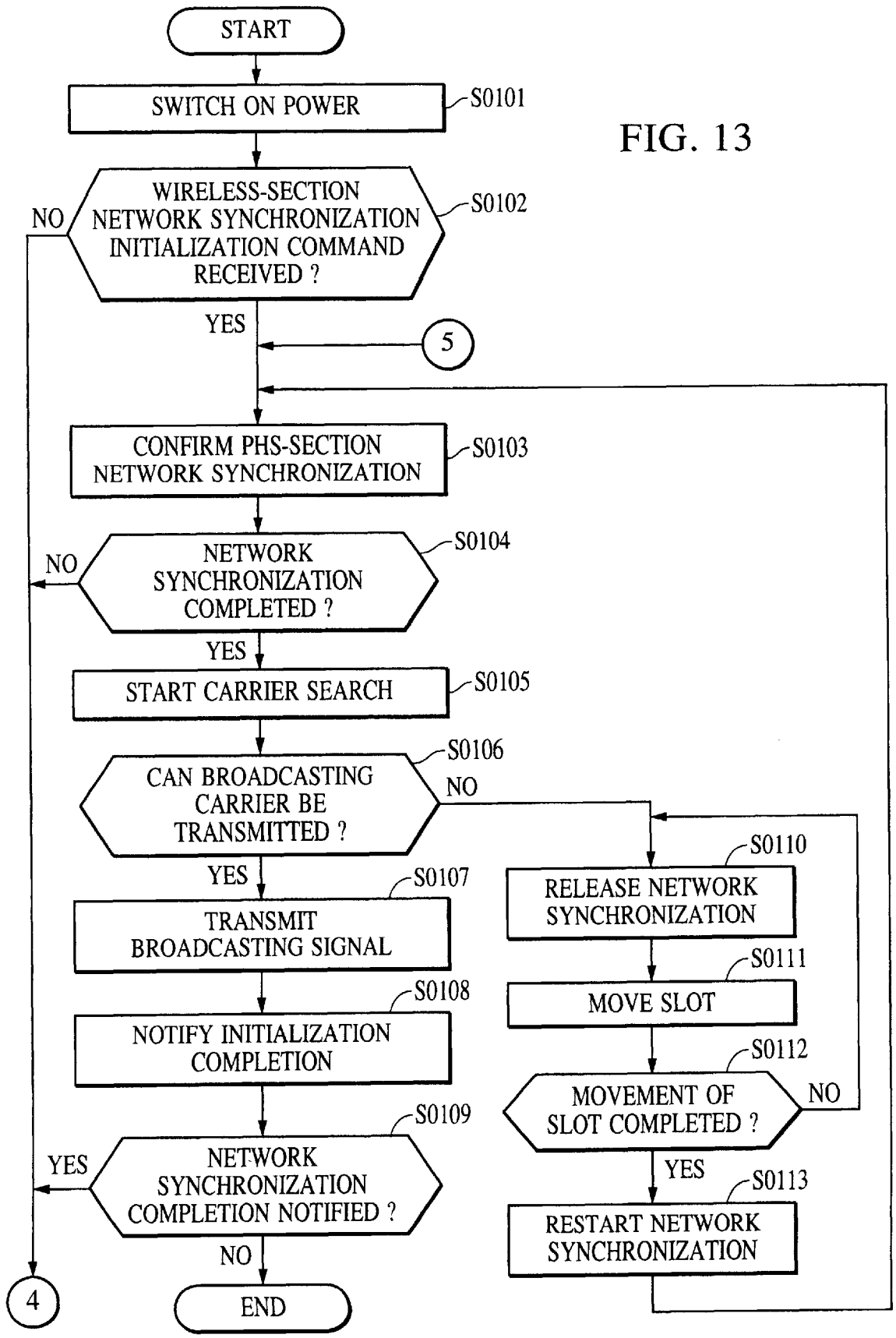
Figure 14:
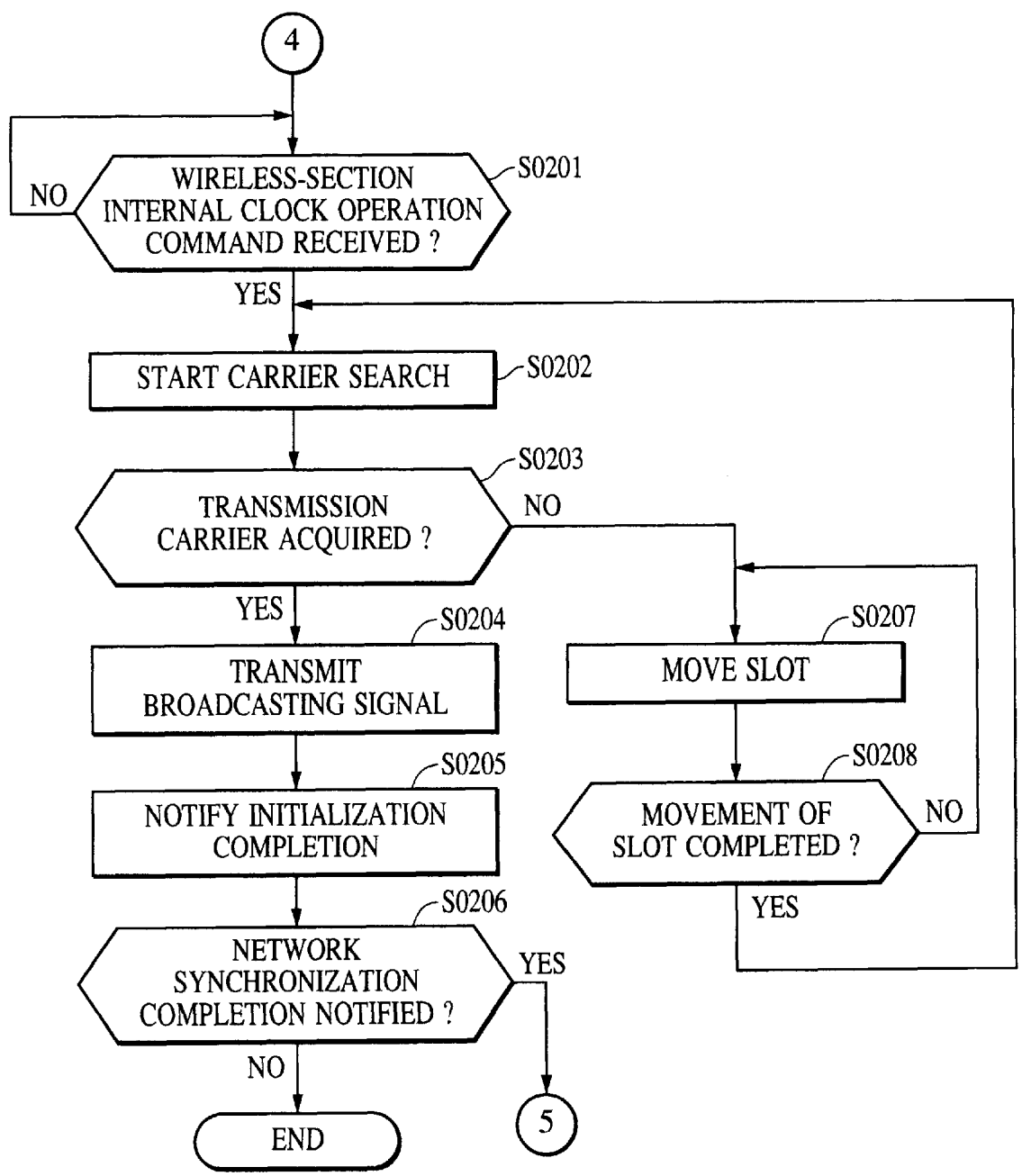
FIG. 14 is a flowchart continuing from FIG. 13.

When power is supplied to this wireless communication apparatus 101, the CPU 238 of the PHS engine section 237 performs operations shown in the flowcharts in FIGS. 13 and 14 in accordance with the program stored in the memory 238M.

More specifically, when power is supplied to the PHS engine section 237 (step S0101), the CPU 238 performs internal setting and the setting of a work area of a memory, and determines whether or not an initialization request signal for initializing the wireless section in accordance with the synchronization with the ISDN 107 by the clock 260 extracted from the ISDN 107 has been received from the MPU 201 of the main unit (step S0102).

When the initialization request signal has been received, data transmission and reception to and from the ISDN 107 are possible. Therefore, the synchronization between the ISDN 107 and the clock 316 for transmission is established by the DPLL 300 in accordance with the signal 260 of 8 kHz, which is output from the T-point interface 225 (step S0103). In the manner described above, with the ISDN synchronization mode, the DPLL 300 generates clocks 261 and 316 synchronized with the clock 260 on the basis of the clocks 260 and 318.

Then, the DPLL 300 determines whether or not network synchronization has been established (step S0104). When the network synchronization has been established, a carrier is searched to output a broadcasting signal (step S0105). At this time, the PHS baseband processing sections 239 and 240 perform carrier sensing by using channels 12ch and 18ch for this purpose as defined by independent standards. The CPU 238 determines the timing of the slot at this time so as to be synchronized with the 8 kHz (clock 260) from the ISDN 107.

Also, when it is determined that transmission is not possible in the reference slot which is operating by the network synchronization (step S0106), the CPU 238 temporarily releases the network synchronization (step S0110). This releasing process is performed when the network synchronization is released after it is confirmed that the network synchronization has been established in step S0104 and the transmission slot is moved in step S0105. When the network synchronization is released, the DPLL 300 generates a clock 316 by frequency-dividing the clock 318 without using the clock 260.

After the network synchronization has been released, the slot used for transmission is moved to a slot through which transmission is possible (step S0111). When it is detected that the movement of the slot has been completed (step S0112), the DPLL 300 is set again so as to be synchronized with the ISDN (step S0113), and the establishment of the network synchronization is confirmed (step S0103).

As a result of the carrier search, when it is determined in step S0106 that a broadcasting signal can be sent in a predetermined slot, the broadcasting signal is transmitted at a predetermined timing by using an LCCH (Logic Control Channel) (step S0107). Then, the CPU 238 notifies the MPU 201 that initialization by the network synchronization has been completed so that communication by the network synchronization is performed (step S0108). During this process, notification by the MPU 201 that synchronization with the network has been terminated is monitored (step S0109). When the completion of the synchronization with the network is not notified, a normal process is continued.

In a case in which a wireless system other than a PHS is adopted, this broadcasting signal may be transmitted in a procedure used in the adopted wireless system.

When the completion of the synchronization with the network has been notified from the MPU 201 in step S0109, the CPU 238 performs a process for operating in the internal clock mode in step S0201 and subsequent steps in FIG. 14 in accordance with the program stored in the memory 238M. When it is determined in step S0102 that an initialization request signal for initializing the wireless section in accordance with network synchronization has not been received and also when it is determined in step S0104 that the network synchronization is not established by the DPLL 300, the process proceeds to a step for operating in the internal clock mode in step S0201 and subsequent steps.

Process During Operation in the Internal Clock Mode

When an operation command in the internal clock mode is received from the MPU 201 (step S0201), the CPU 238 makes the PHS engine section 237 start a carrier search in the internal clock mode (step S0202). In this internal clock mode, the DPLL 300 generates a clock 316 by frequency-dividing the clock 318 without using the clock 260. The PHS baseband processing sections 239 and 240 operate in synchronization with this clock 316.

As a result of the carrier search, when the slot for a broadcasting signal and the frequency cannot be obtained (step S0203), a process for moving to a slot through which transmission is possible is performed (step S0207). In the internal clock mode, the movement of the slot is free. When the movement of the slot is completed (step S0208), a process for obtaining a carrier is performed again (step S0203).

As a result of the carrier search, when it is determined that a broadcasting signal can be transmitted in a predetermined slot (step S0203), the transmission of the broadcasting signal is started at a predetermined timing (step S0204). When the transmission of the broadcasting signal is started, the CPU 238 notifies the MPU 201 that the initialization in the internal clock mode has been completed so that communication by the internal clock is performed (step S0205). During this process, it is monitored that a network synchronization start is notified from the MPU 201 (step S0206). When the notification of the network synchronization start is not performed, a normal process is continued. When the notification of the network synchronization start is performed, the process proceeds to a process for operating in the above-mentioned network synchronization mode.

Voice Communication Operation to and From a PHS Telephone Set

Figure 15:
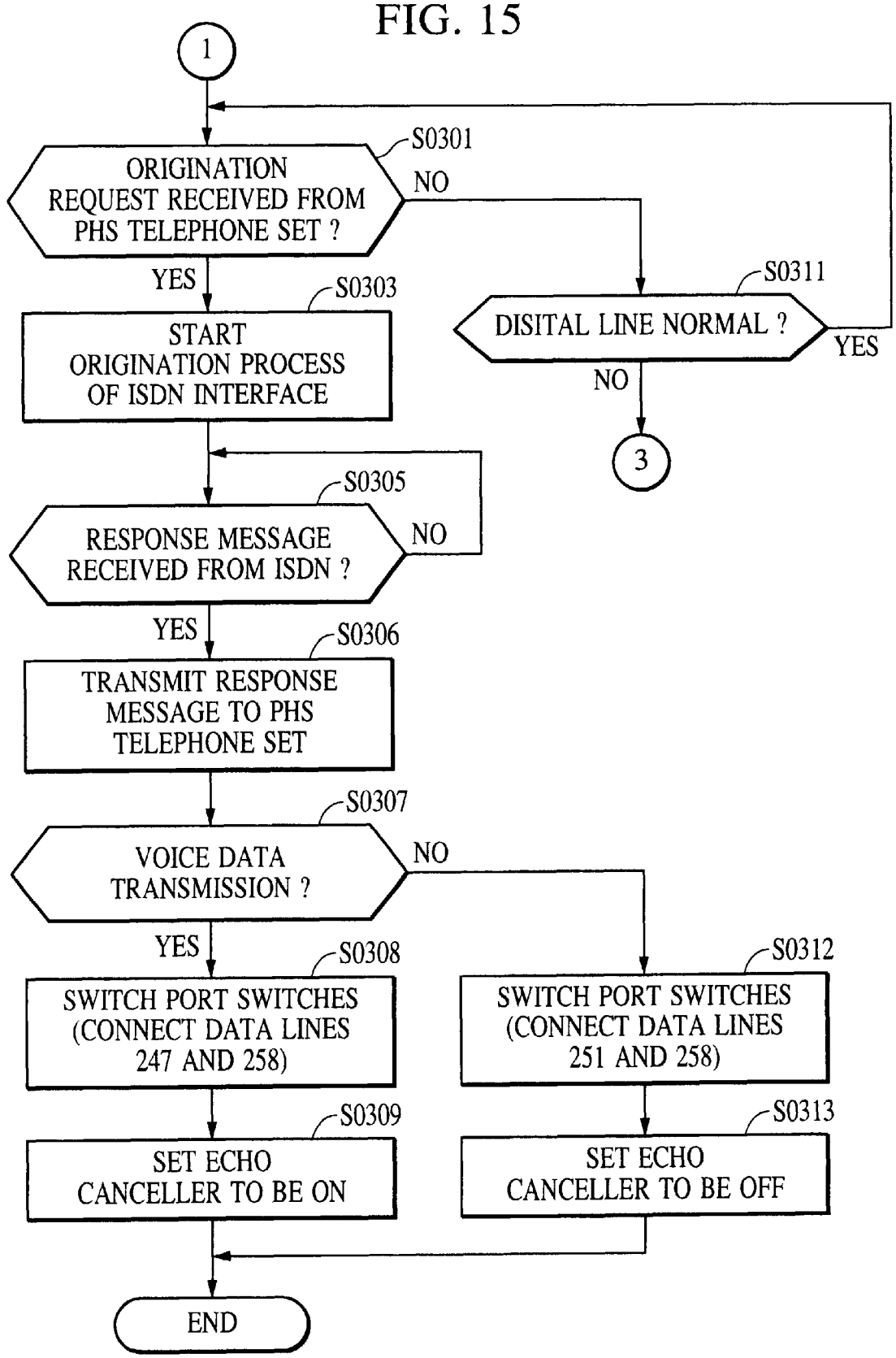
FIG. 15 is a flowchart showing an operation of the MPU 201 during speech communication by a PHS telephone set and during PIAFS communication by a data terminal.

In the wireless data terminal (PHS telephone set 102), when a voice communication operation is performed via the ISDN 107, the MPU 201 of this wireless communication apparatus 101 performs operations shown in the flowchart in FIG. 15 in accordance with a program stored in the ROM 203.

More specifically, in a state in which the outside line origination and reception of step S0008 in FIG. 12 are possible, when dialing is performed by the key operation of the PHS telephone set 102, an origination process is performed between the wireless communication apparatus 101 and the PHS telephone set 102 in accordance with the flowchart shown in FIG. 15.

Specifically, initially, the PHS telephone set 102 transmits, through an SCCH channel, a link channel establishment request signal for a wireless link to the wireless communication apparatus 101. In the wireless communication apparatus 101, when the CPU 238 inside the PHS engine section 237 receives the wireless link channel establishment request signal via the antenna 242, the RF unit 241, and the PHS baseband processing sections 239 and 240, a link channel assignment message is transmitted to the PHS telephone set 102.

When the wireless link establishment request signal is not received from the PHS telephone set 102, the MPU 201 monitors the state of the digital line by monitorring the U-point interface 223 and the T-point interface 225 (step S0311).

When the digital line is in a normal state, a link establishment request signal from the PHS telephone set 102 is monitored (step S0301). When it is determined that the digital line is not in a normal state, a process at the time of line abnormality is performed. This process is performed when the connection with the ISDN 107 is cut off or when the establishment of the network synchronization with the ISDN 107 ceases.

When a link channel assignment is received from the wireless communication apparatus 101, the PHS telephone set 102 transmits a call setting message. The CPU 238 receiving the call setting message sends a call setting confirmation message to the PHS telephone set 102. The PHS telephone set 102 receiving the call setting confirmation message exchanges a wireless management message and a movement-management-related message with the CPU 238 and then transmits an additional information message.

When the additional information message is received, the CPU 238 notifies the MPU 201 by serial communication data 244 that there has been an origination request to the ISDN 107 (step S0301).

The MPU 201 receiving the origination request starts an origination process of the ISDN interface 225 (step S0303). The ISDN interface 225 DMA-transfers the message of layer 3, stored in the RAM 204 by the MPU 201, to the ISDN 107, and exchanges a message with the ISDN 107.

When the response message is received from the ISDN 107, the ISDN interface 225 interrupts the MPU 201 (step S0305), and the MPU 201 instructs the CPU 238 to make a response notification (step S0306). The CPU 238 receiving the instruction transmits a response message to the PHS telephone set 102 via the PHS baseband processing sections 239 and 240, etc., and thereafter, a speech channel is connected between the PHS telephone set 102 and the wireless communication apparatus 101.

Then, when it is confirmed that speech communication is to be performed through the exchange of the call setting message (step S0307), the MPU 201 switches various port switches so that the process proceeds to a process for performing a speech communication. At the same time, the MPU 201 switches the first port switch 229 and the second port switch 233 so that the speech channel of the PHS telephone set 102 and the channel B of the ISDN 107 are connected to each other.

In this embodiment, since speech transmitted and received by the PHS telephone set 102 is transmitted and received by the PHS baseband processing section 239 and is transmitted through the data line 247, a switch 234 of the second port switch 233 is controlled so that the data line 247 is connected to the data line 252. Furthermore, the first port switch 229 is switched so that the data line 252 to which the switch 234 is connected is connected to the data line 258 of channel B1 (step S0308).

In addition, in a case in which speech communication is performed by the PHS telephone set 102, since a line echo occurs due to an influence of a delay due to the wireless transmission frame assembling/disassembling process, it is necessary to operate the echo canceller 226. Accordingly, the MPU 201 performs a predetermined setting via the first port switch 229 so that the echo canceller 226 starts an echo cancel operation (step S0309).

As a result of the above process, the speech input from the PHS telephone set 102 is received by the PHS baseband processing section 239, and the received PCM data (speech data) is transmitted to the ISDN 107 via the echo canceller 226, the ISDN interface 225, the DSU 223, and the connector 222. The speech data received from the ISDN 107 is also transmitted to the PHS telephone set 102 through exactly the same path.

Figure 21:
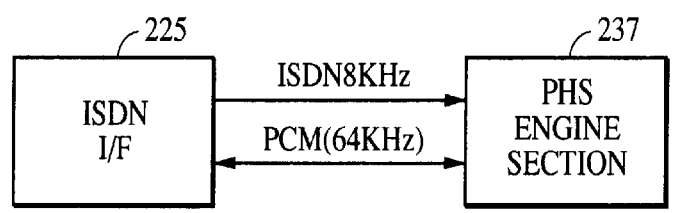
FIG. 21 shows the flow of a synchronization signal and a data signal during PHS communication time.

Next, the flow of a synchronization signal and a data signal during speech communication is described with reference to FIG. 21.

When the network synchronization is established in the DPLL circuit 812 of the ISDN interface 225, a synchronization signal ISDN 8-kHz synchronized with the clock of the ISDN 107 is output. A clock (64 kHz) for performing data transmission and reception in synchronization with this ISDN 8-kHz is also output. A PCM signal is input and output among devices (ICs) in synchronization with this ISDN 8-kHz signal and an ISDN 64-kHz signal.

During speech communication, the ISDN 8-kHz and ISDN 64-kHz signals which are output from the ISDN interface 225, and the PCM speech data are output to the PHS engine section 237. The DPLL 300 produces a synchronization clock 316 in accordance with the ISDN 8-kHz signal 260, and the PHS baseband processing section 239 performs a wireless transmission and reception process in accordance with this synchronization clock 316.

The received speech data is ADPCM/PCM-converted, and is output to the ISDN interface 225 in synchronization with the ISDN 8-kHz signal or the ISDN 64-kHz signal.

PIAFS Communication by Data Terminal 106

Next, the data transmission operation by a PIAFS from the data terminal 106 is described with reference to FIG. 15.

As shown in FIG. 1, the data terminal 106 is connected to the ISDN 107 via the PIAFS card 105, the PHS telephone set 104, and the wireless communication apparatus 101. When this data terminal 106 performs data communication with the other party capable of performing PIAFS data communication, communication application software of the data terminal 106 is started, and an origination request is issued to the PIAFS card 105 is connected to the data terminal 106.

Thereupon, the PIAFS card 105 transfers the origination request to the PHS telephone set 104. The PHS telephone set 104 receiving the origination request performs an origination to the wireless communication apparatus 101 in a manner similar to the PHS telephone set 102 (step S0301), and the wireless communication apparatus 101 performs an origination to the ISDN 107 (step S0303). However, in this case, the information in the call setting message is set to non-limit digital data of 32 kbps.

When a response from the ISDN 107 is received (step S0305), the response message is transmitted to the PHS telephone set 104 (step S0306), and the PHS telephone set 104 notifies the data terminal 106 that the other party has responded via the PIAFS card 105. On the other hand, since the information in the previous call setting message is set to the non-limit digital data of 32 kbps, the wireless communication apparatus 101 determines that the transmission data is PIAFS data (step S0307), and switches the switch 230 inside the first port switch 229 and the switch 231 inside the second port switch 233.

Specifically, the switch 231 is switched so that the signal of the data line 251 is sent to a data line 254 via the I.460 conversion section 236, and the switch 230 is switched so that the signal of the data line 254 is sent to a data line 258 (step S0312). Furthermore, the echo canceller 226 is set to the through mode (step S03013). With the above procedure, the data communication channel is connected.

After the communication channel is established, initially, negotiation of a PIAFS protocol is performed between the data terminal 106 and the terminal of the other party.

A PIAFS negotiation frame transmitted through the PIAFS card 105 is received by the PHS baseband processing section 239 of the wireless communication apparatus 101 via the PHS telephone set 104. The received 32 kbps data is converted into data of 64 kbps by the I.460 conversion section 236 via the data line 251, after which the data is transmitted to the ISDN 107 via the first port switch 229, the echo canceller 226, the ISDN interface 225, and the DSU 223.

In the manner as described above, since transmission and reception of PIAFS data to and from the other party connected to the ISDN 107 can be performed, a PIAFS link with the other party is established by a predetermined negotiation in accordance with the PIAFS protocol, and data transmission and reception are started.

A PIAFS header and a trailer are added to the data (PPP protocol format) that the data terminal 106 transmits through the PIAFS card 105 and are sent to the other party in a flow similar to the negotiation frame. In the other party, the PIAFS header and trailer are deleted, and only the data of the PPP protocol format, stored in the data field, is extracted and is processed by host software.

At this time, the data to be transmitted has a frame structure in accordance with the PIAFS wireless facsimile frame shown in FIG. 10. Also, all the settings of VOX (Voice Operated Transmission) and levels are set to be off. The data received via the PHS telephone set 104 is output as it is to the data signal line 251.

Figure 22:
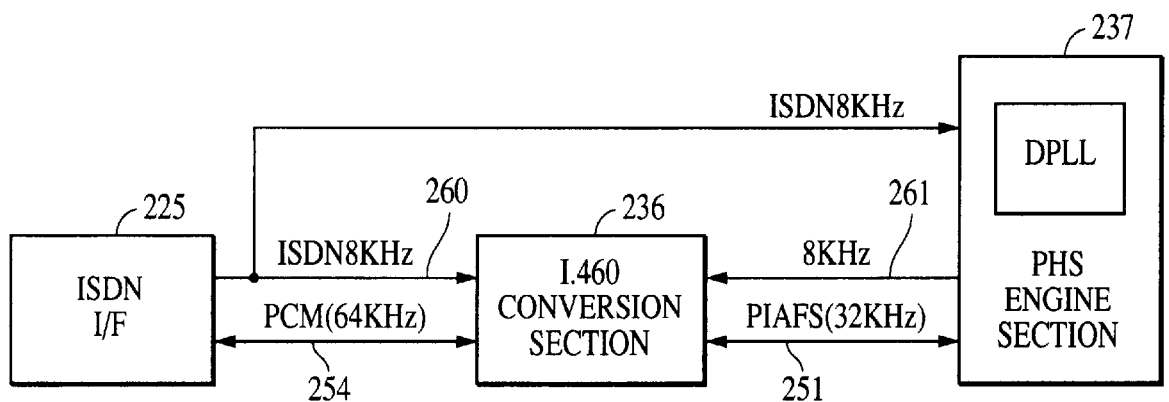
FIG. 22 shows the flow of a synchronization signal and a data signal during PIAFS communication time.

The synchronization signal and the data signal during PIAFS communication flow as shown in FIG. 22.

More specifically, in a manner similar to speech communication, the ISDN 8-kHz and 64-kHz clock signals and the data signal, which are synchronized with the ISDN 107, are input to the PHS engine section 237 and the I.460 conversion section 236.

The PHS engine section 237 produces a synchronization clock 316 by the DPLL 300 provided therein, and performs a wireless transmission and reception process in accordance with this clock 316. Furthermore, the PHS engine section 237 outputs the synchronization signal 261 of 8 kHz, the synchronization of which has been established internally, is output to the I.460 conversion section 236. Also, the 32-kHz signal, which is synchronized with the 8 kHz signal, and the PIAFS data are output to the data signal line 251 at the same time.

The I.460 conversion section 236 performs conversion of data speed of 64 kHz and 32 kHz. In this case, the rise and the phase of the ISDN 8-kHz signal 260 and the ISDN 8-kHz signal 261 can be completely coincident. However, in a case in which PCM signals are multiplexed by using PCM slots, there is a possibility that phases deviate from each other. In a case in which PCM signals are multiplexed, the clock used for data communication is not limited to 64 kHz, and may be a clock, such as a 192 kHz clock, and a clock from 384 kHz to 2048 kHz, which are multiples of 64 kHz.

ISDN Access Operation by Data Terminal 103

Figure 16B:
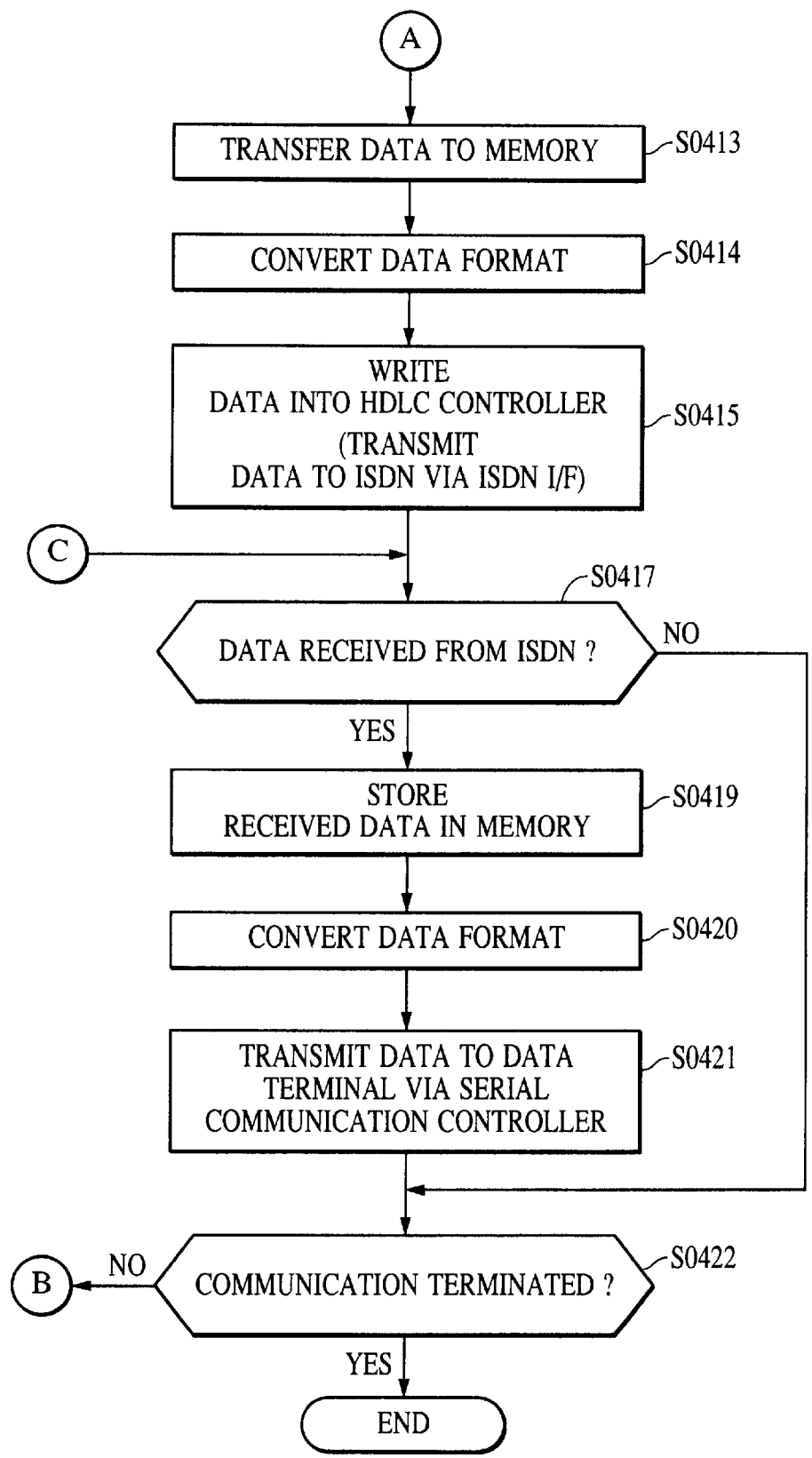

Next, referring to the flowchart in FIG. 16, a description is given of an operation performed by the MPU 201 in accordance with a program stored in the ROM 203 in a case in which the data terminal 103 accesses the ISDN 107 in this wireless communication apparatus 101.

In a case in which the data terminal 103 performs data communication to and from the other party which is connected via the ISDN 107, communication application software of the data terminal 103 is started, and a destination number is transmitted in accordance with an AT command. In the wireless communication apparatus 101, the command is input to the RS232C controller (serial communication controller) 219 via the RS232C connector 221. When the data is received, the RS232C controller 219 interrupts the MPU 201 (step S0401), and the MPU 201 transfers the data stored in the RS232C controller 219 to the RAM 204 (step S0403).

In a case in which an origination request from the data terminal 103 is not received, the MPU 201 monitors the status of the U-point interface 223 and the T-point interface 225, that is, the status of the digital line (step S0423). When the status of the digital line is normal, monitoring of an origination request from the data terminal 103 is performed (step S0401). When the status of the digital line is not normal, a process during line abnormality is performed. When the MPU 201 analyzes the received data and confirms that it is an origination request, the MPU 201 starts an origination process of the ISDN interface 225 (step S0404).

The ISDN interface 225 DMA-transfers the message of layer 3, stored in the RAM 204 by the MPU 201, and exchanges a message with the ISDN 107. When the ISDN interface 225 receives a response message from the ISDN 107, the ISDN interface 225 interrupts the MPU 201 (step S0406).

When the connection with the other party is recognized, the MPU 201 receiving the interruption notifies the data terminal 103 of the connection via the RS232C controller 219 (step S0407). Furthermore, the MPU 201 controls the first port switch 229 so that the data line 257 and the data line 258 are connected to each other (step S0408).

Therefore, the data output from the HDLC controller 227 is transmitted to the ISDN 107 via the echo canceller 226, the ISDN interface 225, the DSU 223, and the connector 222.

At this time, since an echo cancel process need not be performed in the data communication, the MPU 201 sets the echo canceller 226 to a through mode via the first port switch 229 (step S0409). In this manner, the data communication channel is connected, making it possible to transmit and receive data between the data terminal 103 and the ISDN 107.

As a result of receiving a connection notification, the data terminal 103 starts transmitting data. The data to be transmitted at this time has a frame structure in accordance with an asynchronization PPP shown in FIG. 11.

The data transmitted by the data terminal 103 is stored in the RAM 204 via the RS232C controller 219 in a manner similar to the AT command data. That is, when the data is received, the RS232C controller 219 interrupts the MPU 201 (step S0411), the MPU 201 transfers the data to the RAM 204 (step S0413).

Since the stored data conforms with the asynchronization PPP, there is a case in which the same pattern as the flag pattern (01111110) of the HDLC, which is used when the data is transmitted to the ISDN 107, is contained. Accordingly, the MPU 201 reads the stored data and performs a PPP asynchronization/synchronization conversion process in which the flag pattern does not appear in the data (step S0414).

Specifically, when the same bit sequence as that of the flag pattern appears, a process is performed for replacing the data with the control escape (01111101) and data (01011110) (this data is the same as that in which the sixth bit of the flag pattern is inverted). After that, the MPU 201 transfers the data other than the flag pattern to the HDLC controller 227 (step S0415). The HDLC controller 227 transmits data 254 to the first port switch 229 in synchronization with the 64 kHz clock 260 extracted from the ISDN 107, and transmits it to the ISDN 107 via the ISDN interface 225.

Conversely, when the data is received from the ISDN 107, the received data is input to the HDLC controller 227 via the connector 222, the DSU 223, the ISDN interface 225, the echo canceller 226, and the first port switch 229. When a flag pattern is detected from the received data, the HDLC controller 227 interrupts the MPU 201 (step S0417), and the MPU 201 stores the received data in the RAM 204 (step S0419).

After the MPU 201 performs a PPP synchronization/asynchronization conversion process for the stored received data (step S0420), the MPU 201 transmits the received data to the data terminal 103 via the RS232C controller 219 (step S0421). This PPP synchronization/asynchronization conversion process is a reverse conversion process of the conversion process of step S0414. In this manner, it is possible to perform data communication via the ISDN 107 by the data terminal 103.

Figure 23:
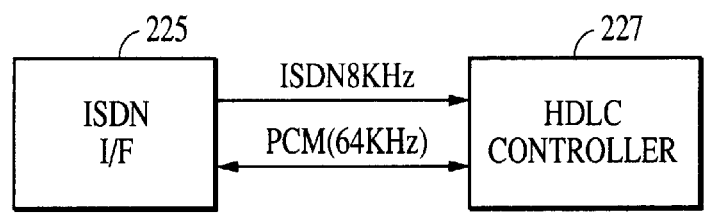
FIG. 23 shows the flow of a synchronization signal and a data signal during communication time by a data terminal which is connected by wire.

FIG. 23 shows the flow of a synchronization signal and a data signal during communication time by a wired data terminal (data terminal 103).

The synchronization signal output from the ISDN interface 225 is directly input to the HDLC controller 227, and the data terminal 103 transmits and receives a PCM signal in synchronization with this synchronization signal. During this process, the synchronization need only be established in only the ISDN interface 225, and the HDLC controller 227 only performs communication by using this synchronization signal.

PPP Transmission of PIAFS Data by Data Terminal 106

In a case in which data communication with the other party which is not capable of performing PIAFS data communication by the data terminal 106 which is connected by wireless, the MPU 201 performs a process shown in the flowchart in FIG. 17 in accordance with a program stored in the ROM 203. In such a case, since data must be transmitted to the other party in the form of PPP data, it is necessary to perform a data conversion process inside the wireless communication apparatus 101.

More specifically, in a case in which data communication is performed from the data terminal 106, communication application software of the data terminal 106 is started, and an origination request is issued to the PIAFS card 105 connected to the data terminal 106. The PIAFS card 105 issues an origination request to the connected PHS telephone set 104, and the PHS telephone set 104 receiving the origination request makes an origination to the wireless communication apparatus 101.

When the PHS engine section 237 of the wireless communication apparatus 101 receives the origination request from the PHS telephone set 104, the PHS engine section 237 interrupts the MPU 201 (step S0501), and the MPU 201 starts an origination process of the ISDN interface 225 (step S0503) so that a call setting message is transmitted to the ISDN 107. In this case, however, since synchronization PPP data of 64 kHz is to be transmitted, the information in the call setting message is set to the non-limit digital data of 64 kbps.

When an origination request from the PHS telephone set 104 is not received, the MPU 201 monitors the status of the ISDN 107 (digital line) by monitoring the status of the U-point interface DSU 223 and the T-point interface 225 (step S0505). When the status of the digital line is normal, a link establishment request from the PHS telephone set 104 is monitored (step S0501). When the status of the digital line is not normal, a process during line abnormality is performed.

When a response from the ISDN 107 is received (step S0505), a response message is transmitted to the PHS telephone set 104 (step S0506), and the PHS telephone set 104 notifies the data terminal 106 via the PIAFS card 105 that the other party has responded, and the communication channel is established.

On the other hand, the wireless communication apparatus 101 switches the switch 230 inside the first port switch 229 and the switch 231 in order to transmit the received PIAFS data, as synchronization PPP data, to the ISDN 107.

Specifically, the switch 231 is switched so that the signal of the data line 251 is sent to the PIAFS data interface of 32 kbps of the PIAFS controller 228 via a data line 255, and at the same time, the switch 230 is switched so that the data interface of 64 kbps of the HDLC controller 227 is connected to a data line 258 via the data line 257 and the switch 230 (step S0507). Also, the MPU 201 sets the echo canceller 226 to the through mode (step S0508). Here, the I.460 conversion section 236 is also set to the through mode in which a conversion process is not performed.

After the communication channel has been established, initially, negotiation of the PIAFS protocol is performed between the data terminal 106 and the PIAFS controller 228 inside the wireless communication apparatus 101.

A communication parameter setting request frame transmitted through the PIAFS card 105 is received by the PHS baseband processing section 239 of the wireless communication apparatus 101 via the PHS telephone set 104. The received data of 32 kbps is input to the first port switch 229 via the data line 251 without being converted in the I.460 conversion section 236 which is sent to the through mode. The data input to the first port switch 229 is input to the PIAFS controller 228.

When the communication parameter setting request frame is received, the PIAFS controller 228 transmits a communication parameter setting acceptance frame to the data terminal 106 via the PHS engine section 237. When the predetermined negotiation procedure is terminated, the PIAFS controller 228 confirms whether or not a wireless data transmission link (PIAFS link) has been established. When the wireless data link has not been established, the communication parameter setting request frame is received again.

When the PIAFS link has been established between the PIAFS card 105 and the PIAFS controller 228, the data to be transmitted by the data terminal 106 is transmitted to the ISDN 107.

Specifically, the PIAFS card 105 adds a PIAFS header and a trailer to the data of a PPP format transmitted from the data terminal 106, and inputs it to the PIAFS controller 228 via the PHS telephone set 104 in a manner similar to the case of the negotiation frame. When it is detected that the data has been received, the PIAFS controller 228 interrupts the MPU 201 (step S0513), notifying the MPU 201 that the data has been received.

The MPU 201 transfers the PPP data in which the header and trailer of the PIAFS frame have been deleted by the PIAFS controller 228 to the RAM 204 (step S0514). Thereafter, the MPU 201 converts the PPP data stored in the RAM 204 into a synchronization PPP format (step S0515), and then writes the data into the HDLC controller 227 (step S0516). From the HDLC controller 227, the data is transmitted in synchronization with the 64-kHz timing signal 260 of the ISDN 107.

The sent data is transmitted to the ISDN 107 via the switch 230, the echo canceller 226, the ISDN interface 225, and the DSU 223.

Conversely, when the data is received from the ISDN 107, the received data is input to the HDLC controller 227 via the connector 222, the DSU 223, the ISDN interface 225, the echo canceller 226, and the first port switch 229.

When a flag pattern is detected from the received data, the HDLC controller 227 interrupts the MPU 201 (step S0518), and the MPU 201 stores the received data in the RAM 204 (step S0520). The MPU 201 performs a PPP synchronization/asynchronization conversion process for the stored data (step S0521), then a header and trailer are added thereto by the PIAFS controller 228, the data is transmitted to the data terminal 106 via the PHS engine section 237 (step S0522).

In the manner as described above, while data transmission and reception are performed to and from the data terminal 106, it becomes possible for the ISDN 107 to perform synchronization PPP data communication.

Figure 24:
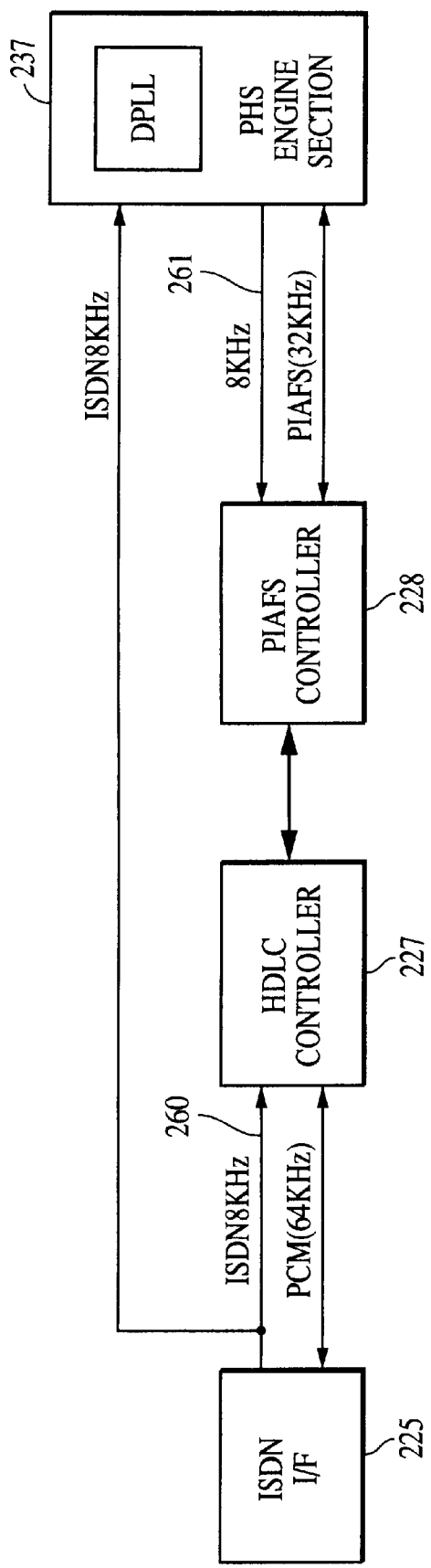
FIG. 24 shows the flow of a synchronization signal and a data signal during synchronous PPP data communication time by a data terminal which is connected by a wireless system.

FIG. 24 shows the flow of a synchronization signal and a data signal during synchronization PPP communication by a data terminal which is connected by wireless.

While this process is being performed, the ISDN 8-kHz signal 260 which is a clock synchronized with ISDN 107 is input to both the HDLC controller 227 and the PHS engine section 237. The HDLC controller 227 and the PHS engine section 237 perform a transmission and reception process in synchronization with the ISDN 8-kHz signal.

When the data is received from the ISDN 107, the HDLC controller 227 disassembles the data in synchronization with the ISDN 8-kHz and 64-kHz signals 260, and transfers it, as data in the form of 8 bits, to the RAM 204. The PIAFS controller 228 assembles the data transferred to the RAM 204 into data of a PIAFS format and transmits it to the PHS telephone set 104 via the PHS engine section 237 in synchronization with the 8-kHz and 32-kHz signals 261 synchronized with the ISDN 107.

Conversely, the PIAFS data transmitted from the PHS telephone set 104 is output from the PHS engine section 237 in synchronization with the 8-kHz and 32-kHz signals 261 from the DPLL 300, and furthermore, data is extracted from the PIAFS format by the PIAFS controller 228 and is transferred to the RAM 204. The HDLC controller 227 reads data from the RAM 204, assembles it to the format of the HDLC, and outputs the data to the ISDN 107 in synchronization with the ISDN 8-kHz and 64-kHz signals 260.

At this time, there is a case in which the rise and the phase of the ISDN 8-kHz signal and the 8-kHz signal of the DPLL 300 are completely coincident with each other. However, there is a possibility that the PCM signals are multiplexed by using a PCM slot, the phases may deviate. In a case in which the PCM signals are multiplexed, the clock used for data communication is not limited to 64 kHz, and it may be a clock, such as a 192 kHz clock, and a clock from 384 kHz to 2048 kHz, which are multiples of 64 kHz.

Communication Operation When Data is Received From the ISDN 107

Figure 18:
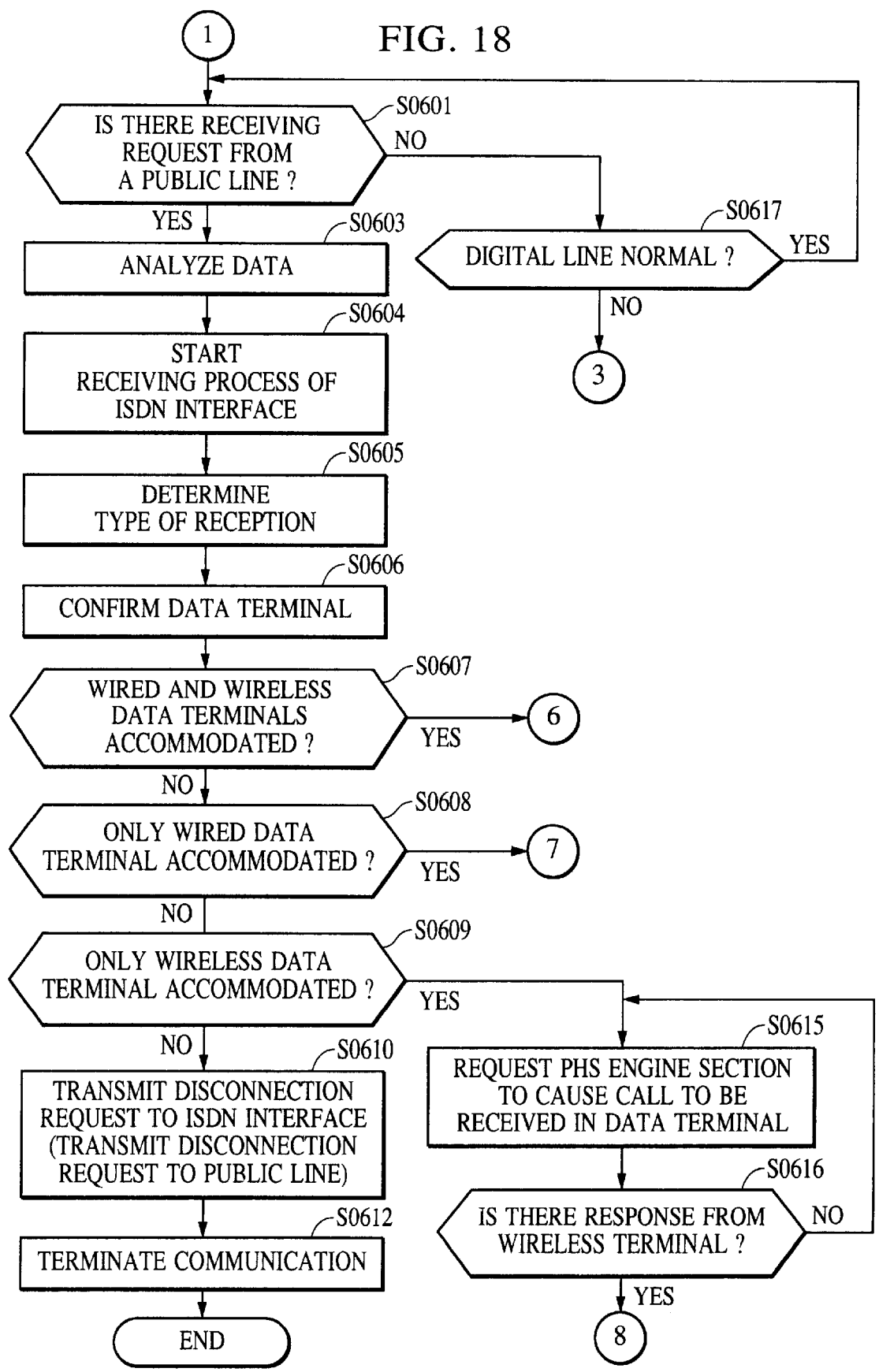
FIG. 18 is a flowchart showing an operation of the MPU 201 when data communication is performed at the time of receipt.
Figure 19:
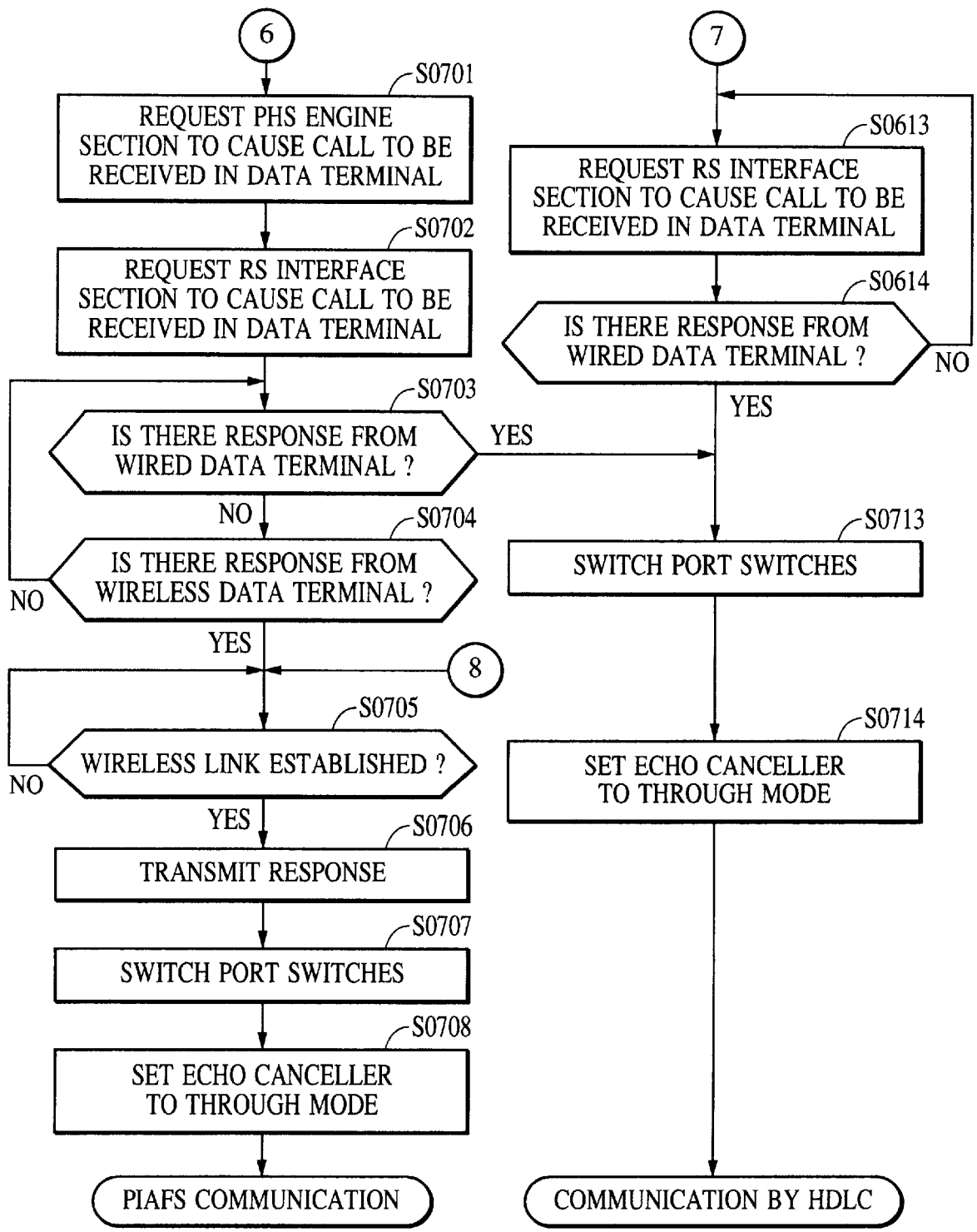
FIG. 19 is a flowchart continuing from FIG. 18.
Figure 20:
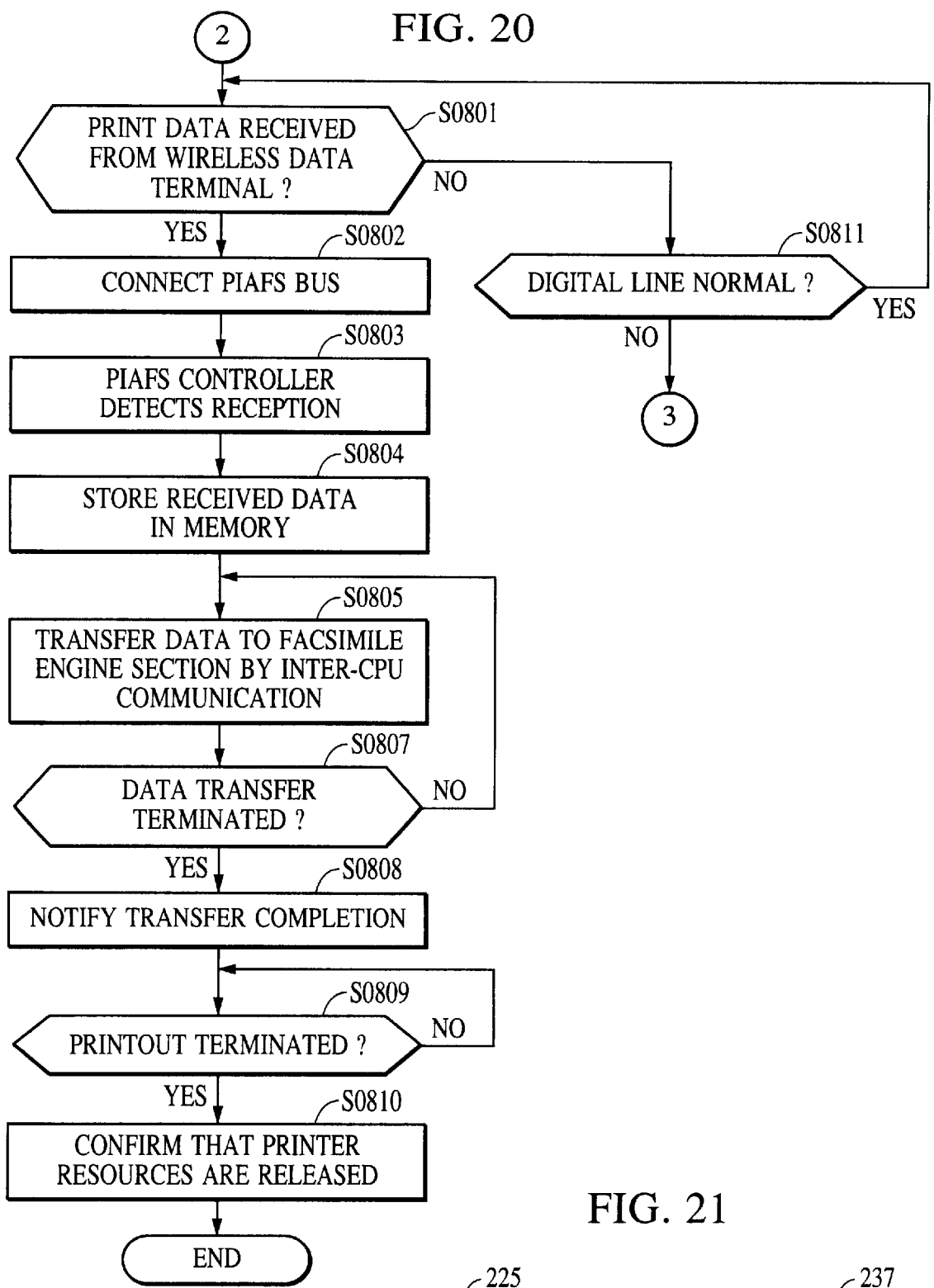
FIG. 20 is a flowchart showing an operation of the MPU 201 at printout time in an internal clock mode.

FIGS. 18 and 19 are flowcharts showing a process performed by the MPU 201 in accordance with a program stored in the ROM 203 so that accommodation of a data terminal in the wireless communication apparatus 101 is confirmed when data is received and communication is performed.

(1) Process at the Time of Receipt

The ISDN interface 225 monitors the presence or absence of data received from the ISDN 107. When it is detected that there is received control data from the ISDN 107, the ISDN interface 225 interrupts the MPU 201 (step S0601) and transfers the data to the RAM 204.

The MPU 201, which is interrupted, reads the received data from the RAM 204 (step S0603), and performs a connection process for an incoming call when this data indicates that there is an incoming call (step S0604). Furthermore, the MPU 201 determines communication of which protocol of speech, data, and wireless data communication should be used on the basis of the call setting in the received call information (step S0605).

In this embodiment, a process is described when a request for performing communication of asynchronization burst data at 32 kbps by a PIAFS data communication protocol is received.

In a case in which a receiving request from the ISDN 107 is not received, the MPU 201 monitors the status of the ISDN 107 (digital line) by monitoring the status of the U-point interface (DSU) 223 and the T-point interface 225 (step S0617). When the status of the digital line is normal, a link establishment request from a PHS telephone set is monitored (step S0601). When the status of the digital line is not normal, a process is performed during line abnormality.

When it is detected that the request is a receipt by the PIAFS data communication protocol, the MPU 201 transmits a message confirming whether or not there is a data terminal connected to the RS232C controller 219 by using an AT command from the RS232C controller 219, and confirms whether or not a data terminal is accommodated and whether or not it can be used (step S0606).

From this result, when the wired and wireless data terminals 103 and 106 are accommodated in the system (step S0607), the MPU 201 notifies the RS232C controller 219 and the PHS engine section 237 that there has been a receipt, and makes the data terminals 103 and 106 receive the signal (steps S0701 and S0702).

When the accommodated data terminal is the data terminal 103 (step S0608), a signal indicating that a call is in progress is transmitted to the ISDN interface 225, and the ISDN 107 is made to transmit the signal. Also, a message prompting a receiving process is transmitted to the RS232C controller 219, and data communication is performed in accordance with the AT command (step S0613). Thereafter, when there is an indication of having received a signal from the data terminal 103 (step S0614), the PIAFS data communication protocol is converted by a data conversion process to a wired video data communication protocol, and communication with the data terminal 103 is started.

Also, when the accommodated data terminal is only the data terminal 106 (step S0609), a signal indicating that a call is being transmitted to the ISDN interface 225, and a signal indicating that a call is in progress is transmitted to the ISDN 107 (step S06015). Then, when a message indicating that there is a response from the data terminal 106 is received from the CPU 238 of the PHS engine section 237 (step S06016), the MPU 201 starts data communication in accordance with a PIAFS transmission protocol in the data terminal 106.

In a case in which it is determined that there is no data terminal which is connected by wire or by wireless when there is a receipt from the ISDN 107, a disconnection request is transmitted to the ISDN interface 225 (step S06010). The ISDN interface 225 transmits the disconnection request to the ISDN 107, thereby terminating the communication (step S06012).

Receiving Process When There is a Data Terminal Which is Connected by Wire or by Wireless The data terminals 103 and 106 which are connected by wire or by wireless are accommodated, and when an application capable of performing data communication is started up, the MPU 201 transmits a signal indicating that a call is being transmitted to the ISDN interface 225, and a signal indicating that a call is being transmitted to the ISDN 107. Also, a message is transmitted to the CPU 238 of the PHS engine section 237 so that the CPU 238 performs a receiving process (step S0701).

Also, a message prompting a receiving process is transmitted to the RS232C controller 219, and the data of the AT command is transmitted (step S0702).

Then, when a response to the receipt is received from the data terminal 103 (step S0703), a response signal is transmitted to the ISDN interface 225, thereby the response signal is transmitted to the ISDN 107 via the DSU 223 and the connector 222. Also, the MPU 201 controls the first port switch 229 so that the data line 256 and the data line 258 are connected to each other (step S0713).

The data output from the PIAFS controller 228 is transmitted to the ISDN 107 via the echo canceller 226, the ISDN interface 225, the DSU 223, and the connector 222. In this data communication, since there is no need to perform an echo cancel process, the MPU 201 sets the echo canceller 226 to the through mode via the first port switch 229 (step S07014).

As a result of the above process, the data communication channel is connected, making it possible for the data terminal 103 to perform data transmission and reception with the ISDN 107. Thereafter, the received data is converted from the PIAFS data communication protocol to the wired data communication protocol, and data communication is performed.

More specifically, for the received data, the data is Li extracted from the FIAFS format by the PIAFS controller 228 and is sent to the data terminal 103 from the RS232C controller 219. Also, the transmission data input from the RS232C controller 219 is assembled into the FIAFS format by the PIAFS controller 228 and is transmitted to the ISDN 107 via the ISDN interface 225.

When a response from the data terminal 103 cannot be confirmed, the MPU 201 confirms a response from the data terminal 106 (step S0704). When a response from the data terminal 106 is confirmed, the MPU 201 confirms the establishment of a wireless link by the CPU 238 of the PHS engine section 237 (step S0705).

When the establishment of the wireless link by the CPU 238 is confirmed, the MPU 201 notifies the ISDN interface 225 of the establishment, causing the ISDN interface 225 to also notify the ISDN 107 via the DSU 223 and the connector 222, and the process proceeds to a process for connecting the speech path between the ISDN 107 and the PHS telephone set 104 (step S0706).

The MPU 201 switches the switch 230 inside the first port switch 229 and the switch 231 inside the second port switch 233 so that PIAFS data is transmitted to and received by the ISDN 107. Specifically, the switch 231 is switched so that the signal of the data line 251 is connected to the ISDN interface 225 via the data line 254 through the I.460 conversion section 236, so that the data line 254 and the data line 258 are connected to each other (step S0707).

Also, the echo canceller 226 is sent to the through mode (step S0708). When this process is terminated, the communication channel between the ISDN 107 and the data terminal 106 is established, making it possible to perform data communication by wireless and via the ISDN 107.

After the communication channel has been established, initially, negotiation of the PIAFS protocol is performed between the data terminal 106 and a terminal on the calling side. A communication parameter setting request frame, transmitted through the PIAFS card 105, is received by the PHS baseband processing section 239 of the wireless communication apparatus 101 via the PHS telephone set 104.

The received 32-kbps data is input to the I.460 conversion section 236 via the data line 251. The I.460 conversion section 236 inserts a dummy bit for transmission to the ISDN 107, into the input data at 32 kbps, and inputs it to the first port switch 229.

In the first port switch 229, PCM data of 64 kbps is transmitted as it is to the ISDN 107 via the data line 258 and the ISDN interface 225.

Also, the PIAFS data received by the ISDN 107 is passed, as PCM data, through the ISDN interface 225, the data line 258, and the first port switch 229, and the dummy bit is deleted in the I.460 conversion section 236, and the data is converted into data of 32 kbps and is transmitted to the PHS engine section 237.

When the predetermined negotiation procedure is terminated, it is confirmed whether or not a wireless data transmission link (PIAFS link) is established. If the wireless data transmission link has not been established, a communication parameter setting request frame is received again. If the PIAFS link has been established, data communication by the PIAFS data communication protocol is started.

A PIAFS header and a trailer are added to the data which is transmitted by the data terminal 106 through the PIAFS card 105. In a flow similar to the communication protocol request frame, a dummy bit is added by the I.460 conversion section 236, and the data is sent to the other party. At the other party, the dummy bit is deleted, the PIAFS header and trailer are deleted, and only the data stored in the data field is extracted and is processed by host software.

Also, in the data which is transmitted by adding the PIAFS header and trailer by the other party, the dummy bit is deleted by the I.460 conversion section 236, the PIAFS header and trailer are deleted through the PIAFS card 105, and the data stored in the data field is passed to the data terminal 106.

Process During Printout by Wireless Data Terminal

In a case in which information that there is a printout request using PIAFS from a data terminal is received when the ISDN 107 is not being used (step S0801), the MPU 201 controls the switch 231 inside the second port switch 233 so that the clock 261 (8 kHz or 32 kHz output from the PHS engine section 237) and the data 251 (signal which is input in synchronization with 32 kHz) are input to the first port switch 229. Also, the first port switch 229 is connected to a path 255 so that this printout request signal is output to the PJAFS controller 228 (step S0802).

When a data receiving request from the PHS engine section 237 is not received, the MPU 201 monitors the status of the ISDN 107 by monitoring the statuses of the DSU 223 and the ISDN interface 225 (step S0811). When the status of the ISDN 107 is normal, the MPU 201 monitors a print data transmission request from the wireless section (step S0801). When the status of the ISDN 107 is normal, a process is performed so that the entire system is operated in accordance with a synchronization signal from the ISDN 107.

The PIAFS controller 228 extracts the received data of 32 kbps as a data part of a predetermined frame, and when it is confirmed that the data is detected normally by the frame detection section provided therein, the PIAFS controller 228 interrupts the MPU 201 (step S0803).

The MPU 201 stores the received data in the RAM 204 (step S0804). The MPU 201 communicates with the CPU 206 of the FAX engine section 205 and transfers the stored data to the memory of the FAX engine section 205 via the shared register 218 (step S0805).

Thereupon, the FAX engine section 205 controls the color printer 208 in accordance with a predetermined procedure and prints out the received data.

During this printout, it is confirmed whether or not the transfer of data from the PHS engine section 237 has been completed (step S0807). When the transferring of data has been completed, the MPU 201 notifies the FAX engine section 205 of the completion and performs a process for disconnection with the wireless section (step S0808).

Also, the MPU 201 monitors the completion of the printout in the color printer 208 (step S0809). When the information that the printout has been completed is received from the CPU 206, assuming that the resources for the printout have been released (step S08010), the process proceeds to a waiting process.

Figure 25:
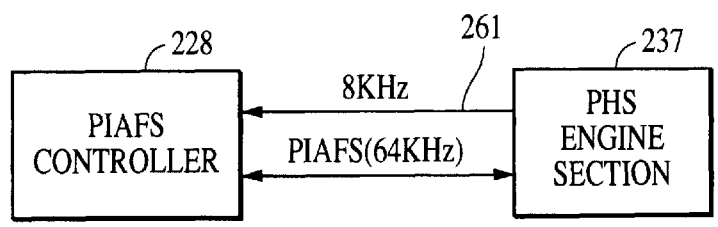
FIG. 25 shows the flow of a synchronization signal and a data signal when connection with the ISDN has not been made.

FIG. 25 shows the flow of a synchronization signal and a data signal when connection with the ISDN 107 has not been made.

When the synchronization with the ISDN 107 is not established due to non-connection, the PHS engine section 237 produces a clock 261 for synchronization, at 8 kHz and 32 kHz from the reference clock of the TCXO 241CK provided therein. Then, the synchronization signal 261 and the PIAFS data 251 are input to the PIAFS controller 228, so that data transmission and reception are performed.

Figure 26:
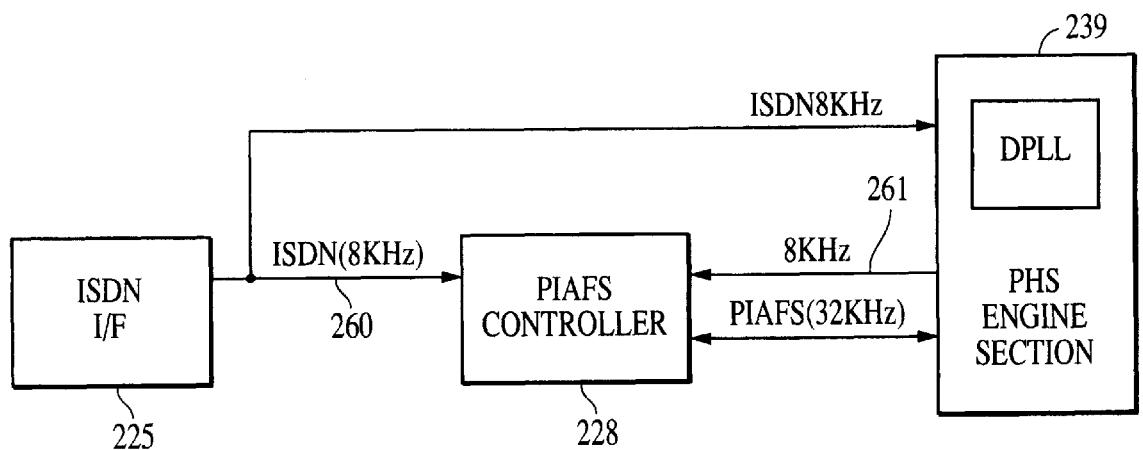
FIG. 26 shows the flow of a synchronization signal and a data signal when synchronization with the ISDN has been established.
Figure 27:
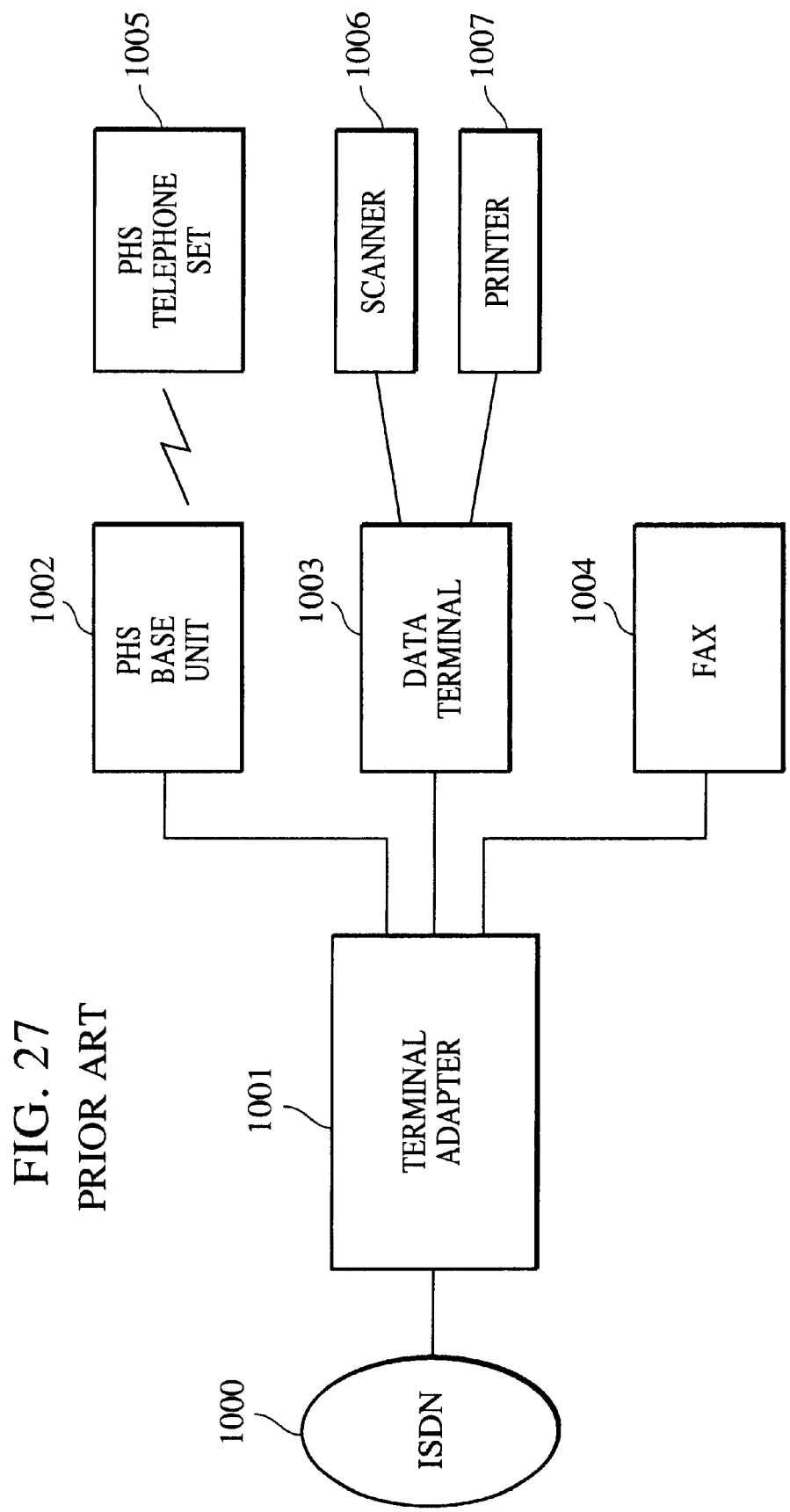
FIG. 27 is a block diagram of a communication system in the related art.
Figure 28:
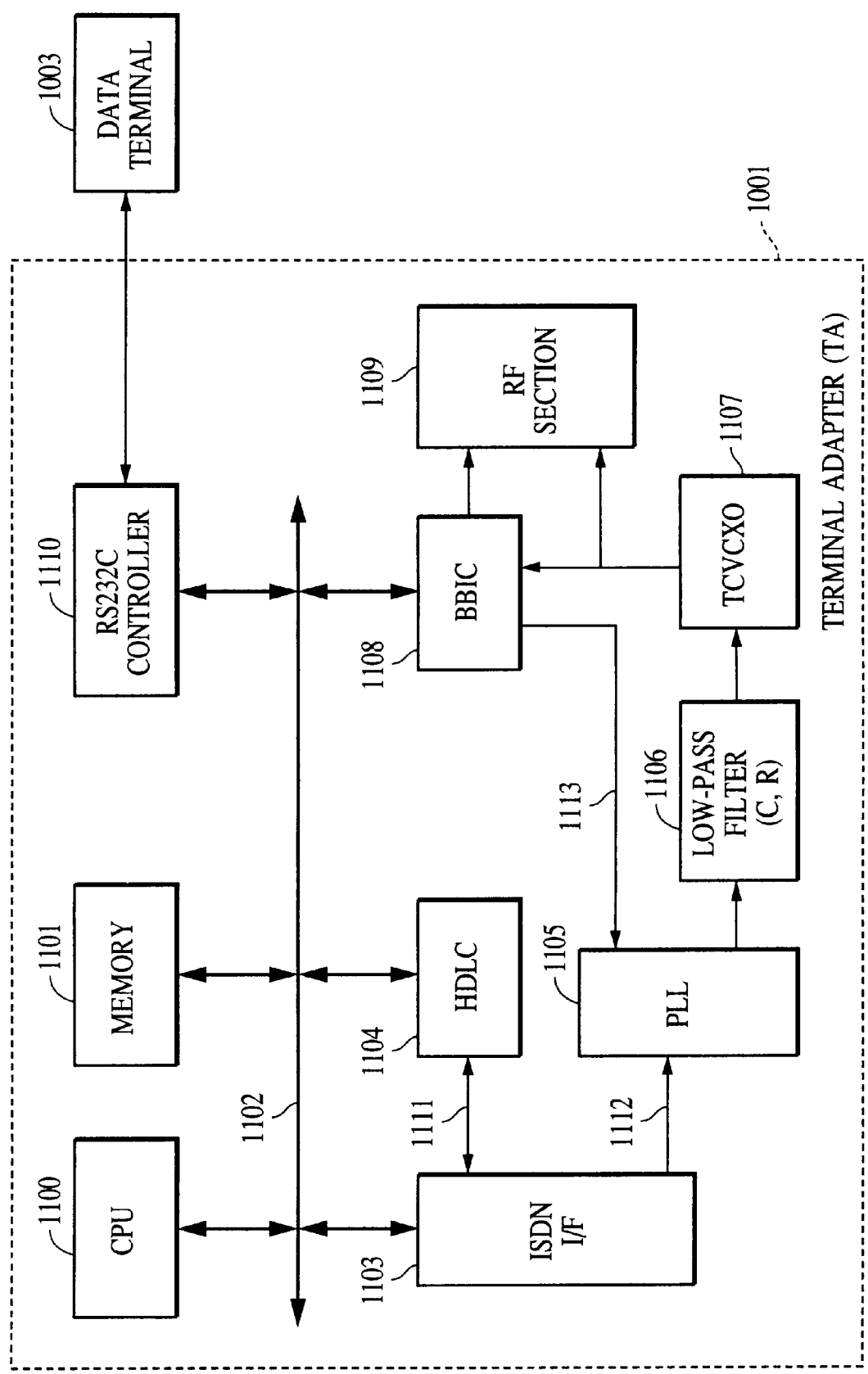
FIG. 28 is a block diagram showing the construction of a terminal adapter in the related art.

FIG. 26 shows the flow of a synchronization signal and a data signal when synchronization with the ISDN has been established.

In a manner similar to that during voice communication, the clock 260 for ISDN 8 kHz and 64 kHz synchronized with the ISDN 107 and the data signal are input to the PHS engine section 237. This signal is also input to the PIAFS controller 228. In the PHS engine section 237, a synchronization clock is produced by the DPLL 300 provided therein, and a wireless transmission and reception process is performed in accordance with this clock. Furthermore, the synchronization signal 261 of 8 kHz, the synchronization of which has been established therein, is output to the PIAFS controller 228. The 32-kHz signal synchronized with the 8 kHz signal and the PIAFS data 251 are also output at the same time.

The PIAFS controller 228 extracts data from the input synchronization signal 261 and PIAFS data and transfers it to the RAM 204. In this case, there is a case in which the rise and the phase of the ISDN 8 kHz and those of 8 kHz are completely coincident with each other. However, when the PCM signal is multiplexed by using a PCM slot, there is a possibility that the phases will deviate from each other. In a case in which the PCM signal is multiplexed, the clock used for data communication is not limited to 64 kHz, and the clock may be a clock, such as a 192 kHz clock, and a clock from 384 kHz to 2048 kHz, which are multiples of 64 kHz.

In this embodiment, although PIAFS is performed by 32 kbps, by combining the outputs of 32 kbps of two BB (baseband) ICs 239 and 240, it is possible to handle data communication at 64 kbps or more in a similar construction.

As has thus been described, in this embodiment, since a clock for synchronization is generated in accordance with a frame signal supplied from the ISDN, it is possible to perform speech and data communication by establishing synchronization with the ISDN in an inexpensive construction without using an expensive TCVCXO.

In addition, since a TCVCXO and a CR circuit of a synchronization processing section are not used, it is possible to reduce the mounting area so as to achieve miniaturization. Furthermore, it is possible to decrease the amount of buffering used in the digital circuit, and the construction is simplified, thereby allowing the throughput, the speech quality, etc., during data communication, to be improved.

The present invention is not limited to the above-described embodiment and, for example, other wireless communication methods and wireless data communication protocols may be used without using the PIAFS as a wireless data communication protocol in the manner as described above.

In addition, the digital public line is not limited to ISDN, and a network, such as an ATM (Asynchronous Transfer Mode), optical communication, a LAN (Local Area Network), satellite communication, etc., may be used in a case in which the synchronization with a network is to be established.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A wireless communication apparatus comprising:
    first clock generation means for generating a first clock synchronized with a digital line;
    high-frequency processing means, having second clock generation means for generating a second clock, for processing a high-frequency signal;
    third clock generation means for generating a third clock for wireless communication on the basis of the first and second clocks; and
    wireless transmission frame processing means for performing a process for assembling and disassembling wireless transmission frames on the basis of the second and third clocks.

2. A wireless communication apparatus according to claim 1, wherein said third clock generation means generates a fourth clock for comparison with the first clock.

3. A wireless communication apparatus according to claim 2, wherein said third clock generation means generates the third clock by inserting or deleting a clock on the basis of the comparison between the first clock and the fourth clock when synchronization with the digital line is established.

4. A wireless communication apparatus according to claim 1, wherein said third clock generation means generates the third clock by frequency-dividing the second clock when synchronization with the digital line is not established.

* * * * *

UNITED STATES PATENT AND TRADEMARK OFFICE
CERTIFICATE OF CORRECTION

PATENT NO. : 6,640,094 B1
DATED : October 28, 2003
INVENTOR(S) : Tabeta

Page 1 of 1

It is certified that error appears in the above-identified patent and that said Letters Patent is hereby corrected as shown below:

Drawings,
Sheet 2, Fig.2, "MOJULAR" (both occurences) should read -- MODULAR --.

Sheet 14, Fig. 15, "DISITAL" should read -- DIGITAL --.

Sheet 15, Fig. 16A, "MEDE" should read -- MODE --.

Figure 17A:
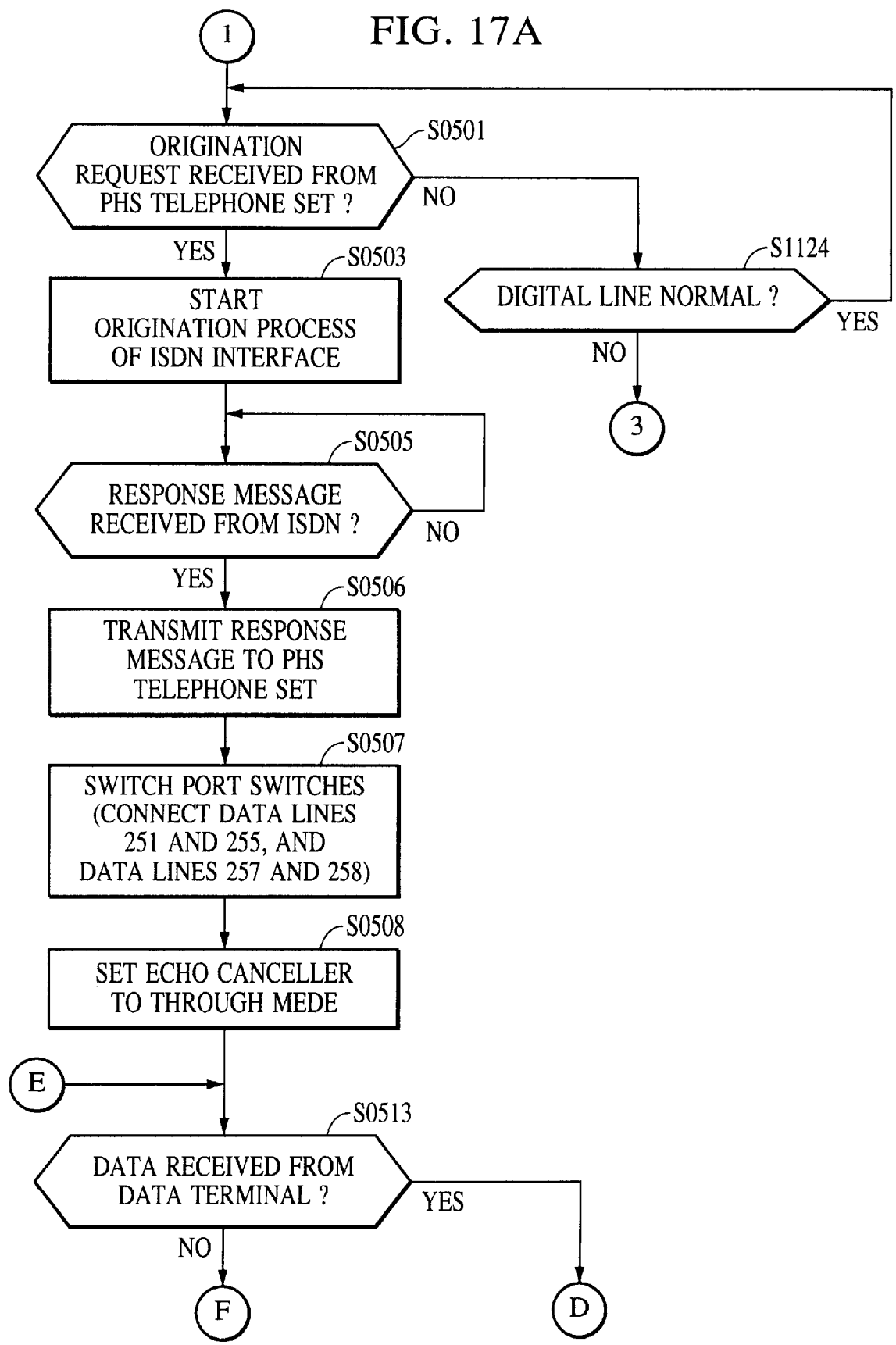

Sheet 17, Fig. 17A, "MEDE" should read -- MODE --.

Column 7,
Line 45, "compliant" should read -- compliance --.

Column 18,
Line 7, "monitorring" should read -- monitoring --.

Signed and Sealed this

Fourteenth Day of September, 2004

JON W. DUDAS
*Director of the United States Patent and Trademark Office*